US011004199B2

(12) United States Patent
Mouton et al.

(10) Patent No.: US 11,004,199 B2
(45) Date of Patent: May 11, 2021

(54) AUTOMATED STEREOLOGY FOR DETERMINING TISSUE CHARACTERISTICS

(71) Applicants: UNIVERSITY OF SOUTH FLORIDA, Tampa, FL (US); STEREOLOGY RESOURCE CENTER, INC., St. Petersburg, FL (US)

(72) Inventors: Peter Randolph Mouton, St. Petersburg, FL (US); Hady Ahmady Phoulady, Portland, ME (US); Dmitry Goldgof, Lutz, FL (US); Lawrence O. Hall, Tampa, FL (US)

(73) Assignees: UNIVERSITY OF SOUTH FLORIDA, Tampa, FL (US); STEREOLOGY RESOURCE CENTER, INC., St. Petersburg, FL (US)

(*) Notice: Subject to any disclaimer, the term of this patent is extended or adjusted under 35 U.S.C. 154(b) by 34 days.

(21) Appl. No.: 16/345,392

(22) PCT Filed: Nov. 10, 2017

(86) PCT No.: PCT/US2017/061090
§ 371 (c)(1),
(2) Date: Apr. 26, 2019

(87) PCT Pub. No.: WO2018/089783
PCT Pub. Date: May 17, 2018

(65) Prior Publication Data
US 2019/0272638 A1    Sep. 5, 2019

Related U.S. Application Data

(60) Provisional application No. 62/420,771, filed on Nov. 11, 2016.

(51) Int. Cl.
*G06K 9/00*     (2006.01)
*G06T 7/00*     (2017.01)
(Continued)

(52) U.S. Cl.
CPC .......... *G06T 7/0014* (2013.01); *G06K 9/0014* (2013.01); *G06K 9/00147* (2013.01);
(Continued)

(58) Field of Classification Search
CPC .. A61N 1/205; G06K 9/0014; G06K 9/00147; G06K 9/00; G06K 9/00134;
(Continued)

(56) References Cited

U.S. PATENT DOCUMENTS 8,345,946 B2 *    1/2013  Ascenzi ............... G06K 9/0014
                                                         382/133
9,739,783 B1 *    8/2017  Kumar ............ G01N 33/57415
(Continued)

OTHER PUBLICATIONS

Benali, A. et al., "A computerized image analysis system for quantitative analysis of cells in histological brain sections," *Journal of Neuroscience Methods*, 2003, 125:33-43, Elsevier Science B.V.
(Continued)

*Primary Examiner* — Guillermo M Rivera-Martinez
(74) *Attorney, Agent, or Firm* — Quarles & Brady LLP

(57) ABSTRACT

Systems and methods for automated stereology are provided. A method can include providing an imager for capturing a Z-stack of images of a three-dimensional (3D) object; constructing extended depth of field (EDF) images from the Z-stack of images; performing a segmentation method on the EDF images including estimating a Gaussian Mixture Model (GMM), performing morphological operations, performing watershed segmentation, constructing
(Continued)

Voronoi diagrams and performing boundary smoothing; and determining one or more stereology parameters such as number of cells in a region.

21 Claims, 13 Drawing Sheets

(51) Int. Cl.

| | | |
|---|---|---|
| G06T 7/11 | (2017.01) | |
| G06T 7/174 | (2017.01) | |
| G06N 20/00 | (2019.01) | |
| G06N 3/08 | (2006.01) | |
| G06T 5/00 | (2006.01) | |
| G06T 5/20 | (2006.01) | |
| G06T 17/20 | (2006.01) | |

(52) U.S. Cl.
CPC .............. *G06N 3/08* (2013.01); *G06N 20/00* (2019.01); *G06T 5/002* (2013.01); *G06T 5/20* (2013.01); *G06T 7/11* (2017.01); *G06T 7/174* (2017.01); *G06T 7/97* (2017.01); *G06T 17/205* (2013.01); *G06T 2207/20081* (2013.01); *G06T 2207/20084* (2013.01); *G06T 2207/20152* (2013.01)

(58) Field of Classification Search
CPC ......... G06K 2209/05; G06K 2209/051; G06K 9/00127; G06N 20/00; G06N 3/08; G06T 2207/20081; G06T 2207/20084; G06T 5/20; G06T 7/0014; G06T 7/11; G06T 7/174; G06T 7/97; G06T 2207/10024; G06T 7/136; G06T 7/187; G06T 5/50; G06T 2200/04; G06T 7/75; G06T 2207/10056; G06T 17/00; G06T 7/30; G06T 7/44; G06T 19/00; G06T 19/20; G06T 7/0012; A01K 29/00; G16B 50/00; C07K 14/475; A61K 38/00; G02B 21/0004; G02B 21/367; G01N 15/1475; G01N 2015/1445; B33Y 50/02; G05B 19/4099; G05B 2219/49007; G06F 30/00
USPC ................ 382/128, 129, 130, 131, 132, 133
See application file for complete search history.

(56) References Cited

U.S. PATENT DOCUMENTS

| | | | | |
|---|---|---|---|---|
| 10,473,667 | B2* | 11/2019 | Vu | ............... G01N 33/57496 |
| 2005/0267011 | A1* | 12/2005 | Deisseroth | ............. A61N 1/205 514/44 R |
| 2009/0238457 | A1* | 9/2009 | Rittscher | ................... G06T 7/11 382/171 |
| 2009/0310833 | A1* | 12/2009 | Ascenzi | ............... G06K 9/0014 382/128 |
| 2010/0119119 | A1* | 5/2010 | Rittscher | ................ A01K 61/95 382/110 |
| 2010/0119127 | A1* | 5/2010 | Bello | ...................... A01K 29/00 382/128 |
| 2012/0236120 | A1* | 9/2012 | Kramer | .............. G06K 9/00134 348/46 |
| 2012/0281883 | A1* | 11/2012 | Hurley | ............... G01N 21/6458 382/109 |
| 2013/0157946 | A1* | 6/2013 | Iqbal | ....................... C07K 7/06 514/8.4 |
| 2015/0346191 | A1* | 12/2015 | Aneja | .................... G16H 50/20 424/94.5 |
| 2016/0131569 | A1* | 5/2016 | Mai | ........................... G06T 7/40 382/128 |
| 2016/0196672 | A1* | 7/2016 | Chertok | ............... G06K 9/4628 382/156 |
| 2016/0250355 | A1 | 9/2016 | Macknik | |
| 2018/0095450 | A1* | 4/2018 | Lappas | ................... B33Y 30/00 |

OTHER PUBLICATIONS

Bonam, O. P. et al., "Toward automated quantification of biological microstructures using unbiased stereology," *Proceedings of SPIE*, Mar. 9, 2011, 7963:1-9, SPIE.

Bradley, A. P. et al., "A One-pass Extended Depth of Field Algorithm Based on the Over-Complete Discrete Wavelet Transform," *ResearchGate*, Jan. 2004, pp. 1-6.

Chaudhury, B. et al., "A Novel Algorithm for Automated Counting of Stained Cells on Thick Tissue Sections," 2012, pp. 1-6, IEEE.

Chaudhury, B. et al., "An Ensemble Algorithm Framework for Automated Stereology of Cervical Cancer," ICIAP, 2013, pp. 823-832, Springer-Verlag Berlin Heidelberg.

Costa, L. D. F., "Fast and accurate nonlinear spectral method for image recognition and registration," *Applied Physics Letters*, 2006, 89(174102):1-4, American Institute of Physics.

Elozory, D. T. et al., "Automatic section thickness determination using an absolute gradient focus function," *Journal of Microscopy*, 2012, 248(3):245-259, Royal Microscopical Society.

Gardi, J. E. et al., "Automatic sampling for unbiased and efficient stereological estimation using the proportionator in biological studies," *Journal of Microscopy*, 2008, 230(1):108-120, the Royal Microscopical Society.

Gundersen, H. J. G. et al., "Some new, simple and efficient stereological methods and their use in pathological research and diagnosis," *APMIS*, 1988, 96:379-394.

Gundersen, H. J. G. et al., "The new stereological tools: Disector, fractionator, nucleator and point sampled intercepts and their use in pathological research and diagnosis," *APMIS*, 1988, 96:857-881.

Ho, S. et al., "NeurphologyJ: An automatic neuronal morphology quantification method and its application in pharmacological discovery," *BMC Bioinformatics*, 2011, 12(230):1-18, BioMed Central Ltd.

Inglis, A. et al., "Automated identification of neurons and their locations," *J Microsc.*, Jun. 2008, 230(3):339-352.

Kaplan, S. et al., "The Disector Counting Technique," *NeuroQuantology*, Mar. 2012, 10(1):44-53.

Lin, G. et al., "Hierarchical, Model-Based Merging of Multiple Fragments for Improved Three-Dimensional Segmentation of Nuclei," *Cytometry Part A*, 2005, 63A:20-33, 2004 Wiley-Liss, Inc.

Liu, J. Y. et al., "High-throughput, automated quantification of white matter neurons in mild malformation of cortical development in epilepsy," *Acta Neuropathologica Communications*, 2014, 2(72):1-10, BioMed Central Ltd.

Long, X. et al., "A New Preprocessing Approach for Cell Recognition," *IEEE Transactions on Information Technology in Biomedicine*, Sep. 2005, 9(3):407-412, IEEE.

Long, X. et al., "Automatic detection of unstained viable cells in bright field images using a support vector machine with an improved training procedure," *Computers in Biology and Medicine*, 2006, 36:339-362, Elsevier Ltd.

Miller, D. J. et al., "Three counting methods agree on cell and neuron number in chimpanzee primary visual cortex," *Frontiers in Neuroanatomy*, May 16, 2014, 8(36):1-11.

Mouton, P. R. et al., "Design-Based Stereology and Video Densitometry for Assessment of Neurotoxicological Damage," *V. target organ toxicology series*, Mar. 2010, pp. 243-267.

Mouton, P. R., "Applications of Unbiased Stereology to Neurodevelopmental Toxicology," *Developmental Neurotoxicology Research: Principles, Models, Techniques, Strategies, and Mechanisms*, 2011, pp. 53-75, John Wiley & Sons, Inc.

Mouton, P. R. et al., "Automatic stereology of substantia nigra using a novel segmentation framework based on the balloon active contour model," Oct. 21, 2015, pp. 1-4.

Mouton, P. R., "Unbiased Stereology: A concise Guide," *The Johns Hopkins University Press*, Aug. 2011, pp. 1-75.

(56) References Cited

OTHER PUBLICATIONS

Mouton, P. R., "Quantitative Anatomy Using Design-Based Stereology," *Handbook of Imaging in Biological Mechanics*, Oct. 2014, pp. 217-228.

Mouton, P. R et al., "Tg4510 mice provide an effective model for testing neuroprotective therapies in early-stage Alzheimer's disease." *Soc. Neurosci*, 2016, pp. 1-2.

Nattkemper, T. W. et al., "A Neural Classifier Enabling High-Throughput Topological Analysis of Lymphocytes in Tissue Sections," *IEEE Transactions on Information Technology in Biomedicine*, Jun. 2001, 5(2):138-149, IEEE.

Peng, S. "Neuron recognition by parallel Potts segmentation," *PNAS*, Apr. 1, 2003, 100(7):3847-3852.

Phoulady, H. A. et al., "An Approach for Overlapping Cell Segmentation in Multi-Layer Cervical Cell Volumes," 2 pages.

Phoulady, H. A. et al., "A New Approach to Detect and Segment Overlapping Cells in Multi-Layer Cervical Cell Volume Images," 2016, pp. 201-204, IEEE.

Phoulady, H. A. et al., "Experiments with Large Ensembles for Segmentation and Classification of Cervical Cancer Biopsy Images," *IEEE International Conference on Systems, Man, and Cybernetics*, Oct. 2014, pp. 870-875, IEEE.

Phoulady, H. A. et al., "Nucleus segmentation in histology images with hierarchical multilevel thresholding," *Proceedings of SPIE*, 2016, 9791:1-7, SPIE.

Ray, N. et al., "Tracking Leukocytes in Vivo with Shape and Size Constrained Active Contours," *IEEE Transactions on Medical Imaging*, Oct. 2002, 21(10):1222-1235, IEEE.

Santacruz, K. et al., "Tau Suppression in a Neurodegenerative Mouse Model Improves Memory Function," *Science*, Jul. 15, 2005, 309:476-481.

Savitzky, A. et al., "Smoothing and Differentiation of Data by Simplified Least Squares Procedures," *Analytical Chemistry*, Jul. 1964, 36(8):1627-1639.

Schmitz, C. et al., "Current automated 3D cell detection methods are not a suitable replacement for manual stereologic cell counting," *Frontiers in Neuroanatomy*, May 7, 2014, 8(27):1-13.

Sjöström, P. J. et al., "Artificial Neural Network-Aided Image Analysis System for Cell Counting," *Cytometry*, 1999, 36:18-26, Wiley-Liss, Inc.

Slater, D. et al., "A Machine Vision System for the Automated Classification and Counting of Neurons in 3-D Brain Tissue Samples," *Third IEEE Workshop on Application of Computer Vision WACV-96*, Dec. 2-4, 1996, pp. 1-12, IEEE.

Spires, T. L. et al., Region-specific Dissociation of Neuronal Loss and Neurofibrillary Pathology in a Mouse Model of Tauopathy, *American Journal of Pathology*, May 2006, 168(5):1598-1607, American Society for Investigative Pathology.

Sterio, D. C., "The unbiased estimation of number and sizes of arbitrary particles using the dissector," *Journal of Microscopy*, May 1984, 134(2):127-136, The Royal Microscopical Society.

Tapias, V. et al., "Automated imaging system for fast quantitation of neurons, cell morphology and neurite morphometry in vivo and in vitro," *Neurobiol. Dis.*, Jun. 2013, 54:158-168, Elsevier Inc.

Valdecasas, A. G. et al., "On the extended depth of focus algorithms for bright field microscopy," *Micron*, 2001, 32:559-569, Elsevier Science Ltd.

Vedel Jensen, E. B. et al., "The rotator," *Journal of Microscopy*, Apr. 1993, 170(1):35-44, The Royal Microscopical Society.

West, M. J. et al., "Unbiased Stereological Estimation of the Total Number of Neurons in the Subdivisions of the Rat Hippocampus Using the Optical Fractionator," *The Anatomical Record*, 1991, 231:482-497, Wiley-Liss, Inc.

Wicksell, S. D., "The Corpuscle Problem. A Mathematical Study of a Biometric Problem." *Biometrika*, Jun. 1925, 17(1/2):84-99, Oxford University Press on behalf of Biometrika Trust.

Xie, Y. et al., "Deep Voting: A Robust Approach Toward Nucleus Localization in Microscopy Images," *MICCAI*, 2015, pp. 374-382, Springer International Publishing Switzerland.

Mouton, P. R. et al., "Unbiased estimation of cell number using the automatic optical fractionator," *Journal of Chemical Neuroanatomy*, 2017, 80:A1-A8, Elsevier B.V.

International Search Report in International Application No. PCT/US2017/061090, filed Nov. 10, 2017.

Xing, R. et al., "Robust Nucleus/Cell Detection and Segmentation in Digital Pathology and Microscopy Images: A Comprehensive Review," *IEEE Reviews in Biomedical Engineering*, Jan. 6, 2016, pp. 1-31.

\* cited by examiner

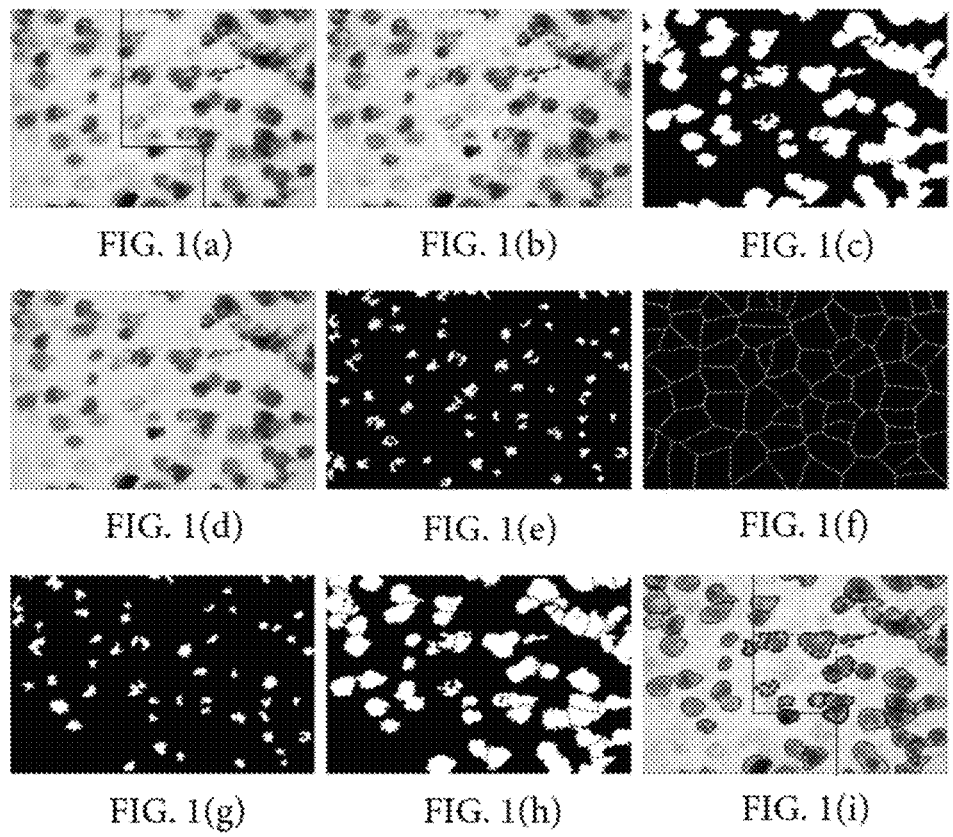
FIGURE 1. INTERMEDIATE RESULTS OF DIFFERENT STEPS IN SEGMENTATION-STEREOLOGY APPROACH: (a)
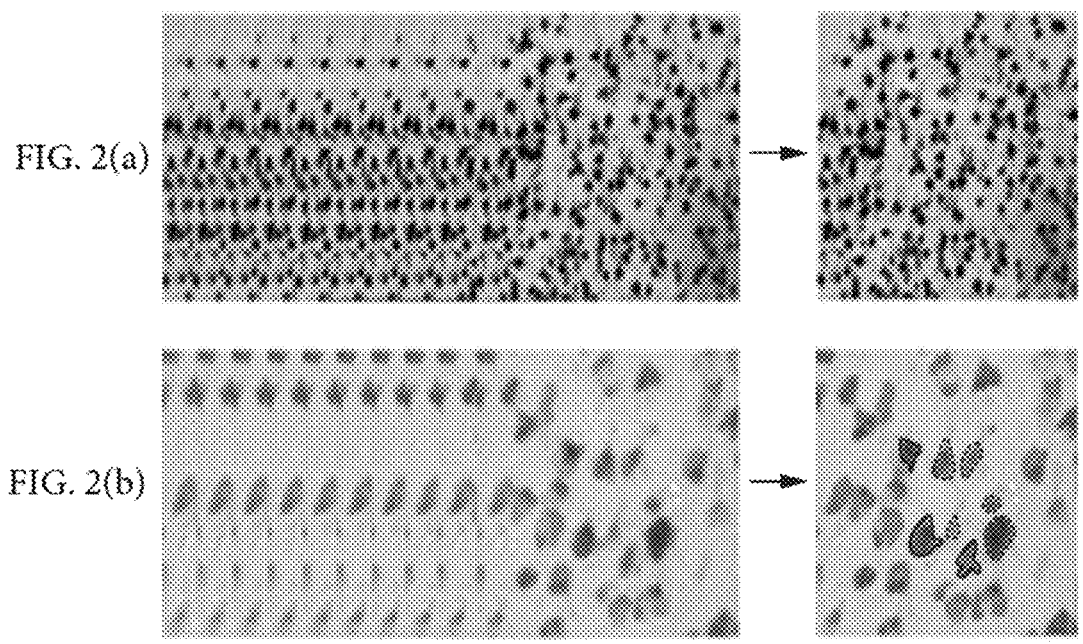

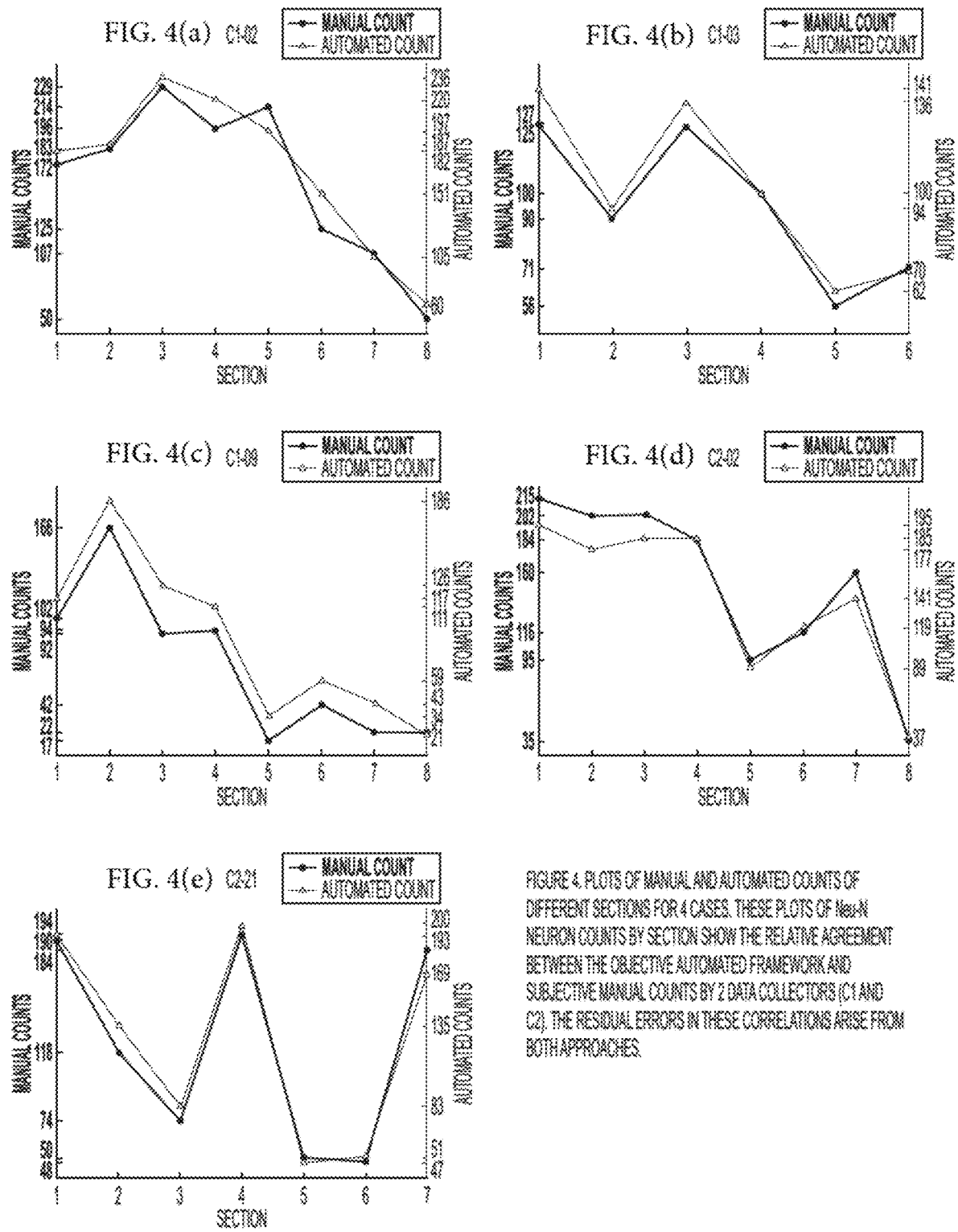
FIGURE 4. PLOTS OF MANUAL AND AUTOMATED COUNTS OF DIFFERENT SECTIONS FOR 4 CASES. THESE PLOTS OF NeuN NEURON COUNTS BY SECTION SHOW THE RELATIVE AGREEMENT BETWEEN THE OBJECTIVE AUTOMATED FRAMEWORK AND SUBJECTIVE MANUAL COUNTS BY 2 DATA COLLECTORS (C1 AND C2). THE RESIDUAL ERRORS IN THESE CORRELATIONS ARISE FROM BOTH APPROACHES.

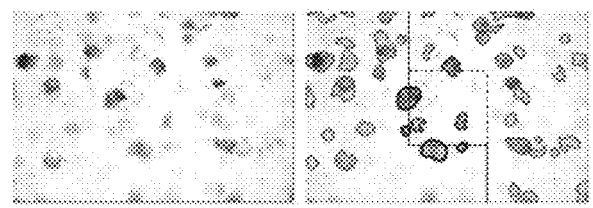
FIG. 5(a)
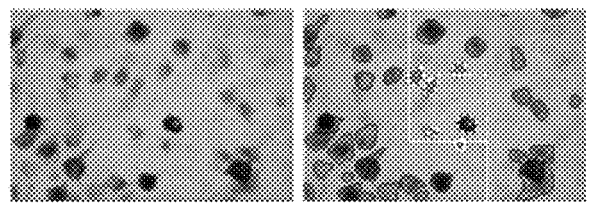
FIG. 5(b)
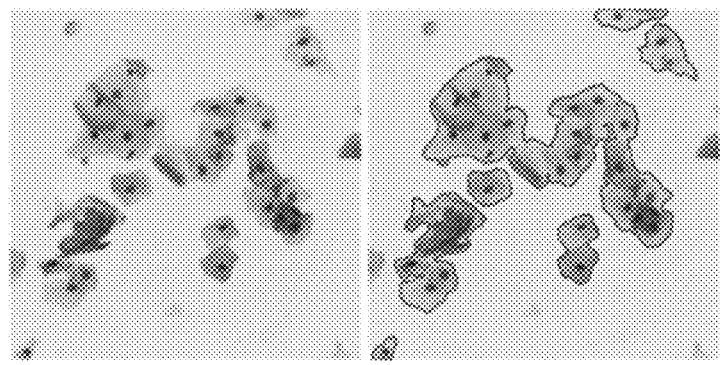
FIG. 6(a)   NUCLEUS SEGMENTATION   CELL CLUMP SEGMENTATION   FIG. 6(b)
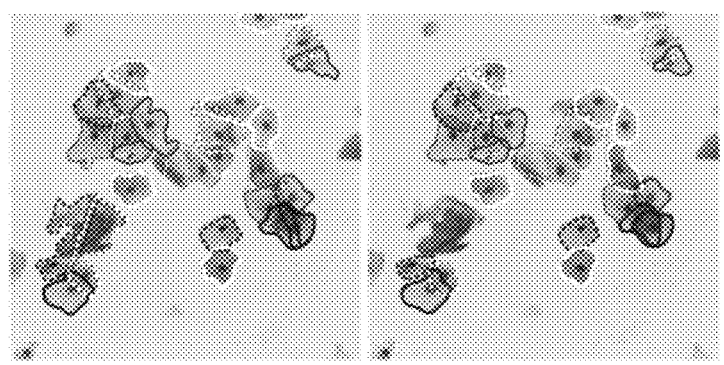
FIG. 6(c)   CYTOPLASM APPROXIMATION   CYTOPLASM REFINEMENT   FIG. 6(d)

FIG. 7

```
   Input : EDF image I, min nucleus size m, min solidity s, low threshold t₁, high
           threshold t₂ and min area and outer boundary average intensity
           difference d
   Output: Binary mask of nucleus segmentation N
 1  N ← ∅
 2  I ← Wiener (I)
 3  for t ← t1 to t2 step 10 do
 4  |   B ← I ≤ t
 5  |   foreach region r in B do
 6  |   |   if size of r < m or solidity of r < s then
 7  |   |   |   remove r
 8  |   |   else if binary mask of r ∩ N = ∅ then
 9  |   |   |   N ← N ∪ r
10  |   |   else
    |   |   |   /* r overlaps with regions r₁, r₂,...,rₙ in N           */
11  |   |   |   if solidity of r ≥ solidities of all regions r₁, r₂,...,rₙ then
12  |   |   |   |   N ← N ∪ r
13  |   |   |   else
14  |   |   |   |   remove r
15  |   |   |   end
16  |   |   end
17  |   end
18  end
19  foreach region r in N do
20  |   dilate r
21  |   if average intensity of r − average intensity of outer boundary < d then
22  |   |   remove r
23  |   end
24  end
```

FIG. 8

$$Q(q) = \inf\left\{x \in \mathbb{R}, q \le \frac{1}{\sqrt{2\pi}\sigma_b} e^{-\frac{(z-\mu_b)^2}{2\sigma_b^2}}\right\} \quad (1)$$
$$= \mu_b + \sqrt{2}\sigma_b \operatorname{erf}^{-1}(2q-1),$$

$$S_{i,j}^{i',j'} = \sqrt{\sum_{k=1}^{20}\left(\overline{F_{i,j}^k} - \overline{F_{i',j'}^k}\right)^2}, \quad (2)$$

$$C_{i,j}^{i',j'} = \sqrt{(i-i')^2 + (j-j')^2}, \quad (3)$$

$$L_{i,j}^{i',j'} = \exp\left(-\frac{C_{i,j}^{i',j'^2} + S_{i,j}^{i',j'^2}}{2\alpha^2}\right), \quad (4)$$

$$L_{i,j}^m = \frac{1}{m'}\left(\sum_{s=1}^{m'} L_{i,j}^{i_s,j_s}\right), \quad (5)$$

$$\beta L_{i,j}^m - \sum_{\substack{n=1\\n\ne m}}^{N} L_{i,j}^n > 0, \quad (6)$$

$$W_\theta = \left(\frac{1}{1+\exp(-\alpha(\frac{1}{2}-\frac{|r_\theta-s|}{r_\theta}))}\right)_{s=0}^{2r_\theta}, \quad (7)$$

$$I(p_\theta^{s+1}) - I(p_\theta^{s-1}), \quad (8)$$

$$i_\theta = \arg\max_{s \in \{0,1,\ldots 2\theta\}} W_\theta(s) G(p_{\theta,s}), \quad (9)$$

$$DSC_{A,B} = \frac{2|A \cap B|}{|A|+|B|}, \quad (10)$$

$$\frac{|A \cap B|}{\max\{|A|,|B|\}} > 0.6, \quad (11)$$

FIG. 11
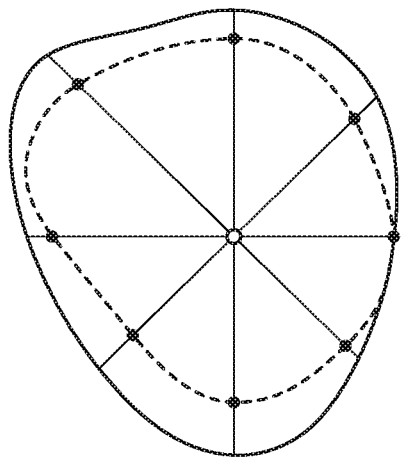
FIG. 12
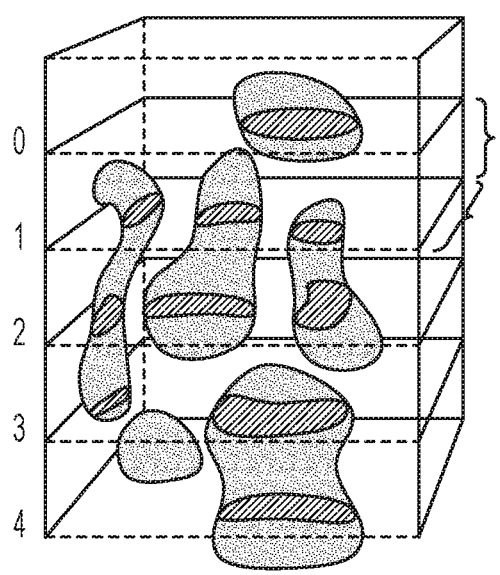
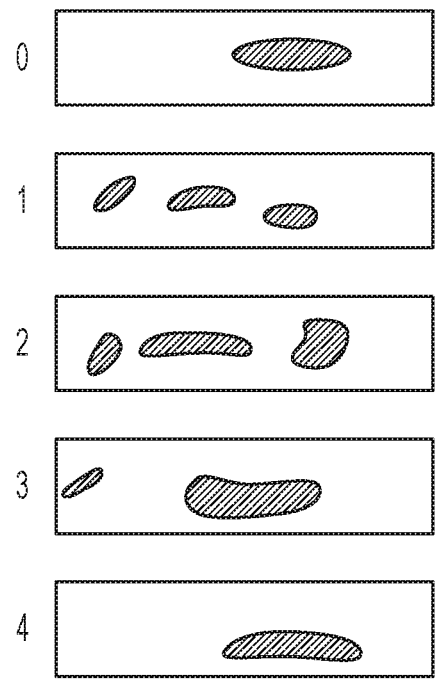

FIGURE 4. EDF IMAGES OF GFAP ASTROCYTES (UPPER) AND Iba-1 MICROGLIA (LOWER) AT HIGH POWER (100x OIL na 1.3).

FIGURE 8. OUTLINED REFERENCE SPACE ON TISSUE SECTIONS OF MOUSE BRAIN.

FIGURE 9. SCHEMATIC SHOWING STACKS OF Z-AXIS IMAGES (DISECTOR STACKS) AT SYSTEMATIC-RANDOM LOCATIONS.

AUTOMATED STEREOLOGY FOR DETERMINING TISSUE CHARACTERISTICS

CROSS CROSS-REFERENCE TO RELATED APPLICATIONS

This application is the U.S. National Stage Application of International Patent Application No. PCT/US2017/061090, filed Nov. 10, 2017, which claims the benefit of U.S. Provisional Patent Application Ser. No. 62/420,771, filed Nov. 11, 2016, the disclosures of which are hereby incorporated by reference in its entirety, including any figures, tables, or drawings.

GOVERNMENT SUPPORT

This invention was made with government support MH076541 awarded by the National Institutes of Health. The Government has certain rights to the invention.

FIELD OF THE INVENTION

The present invention relates to automated stereology methods and apparatuses. More specifically, the present invention relates to methods and apparatus for determining the characteristics of a tissue sample, including the number and size of cells.

BACKGROUND OF THE INVENTION

Unbiased stereology is used to quantify properties of higher dimensional (e.g., 3D) objects using lower dimensional (e.g., 2D) sections of the object. Computer based stereology systems acquire data from 3D structures and have been developed to extract an unbiased estimation of geometric properties including length, area, volume, and population size of objects within a biological sample. Biological applications of stereology include the unbiased estimation of a regional volume of tissue, surface area and length of cells and curvilinear fibers, and the total number of cells (objects of interest) in a defined reference space (region of interest).

Design-based (unbiased) stereology is the current best practice for quantifying the number of cells in a tissue sample. The majority of funding agencies, journal editors, and regulatory bodies prefer the sound mathematical basis of stereology approaches over assumption- and model-based methods. The major obstacle to high throughput applications is that current stereology approaches require time- and labor-intensive manual data collection, which can be prohibitive on tissue samples that include multiple cell types. For example, section or slice thickness determination may be carried out by a user performing manual adjustments using the microscope's fine focusing mechanism to locate the boundaries of slice. In addition, a user may also be required to manually locate and select objects of interest while stepping through stained tissue sections in order to perform quantitative analysis of biological microstructures. Therefore, there is a continuing need to reduce the number of manual steps required, as well as increase the efficiency and accuracy of automated stereology.

BRIEF SUMMARY OF THE INVENTION

Embodiments of the present invention include systems and methods for automated stereology. Embodiments of the present invention include an automatic optical fractionator that can obtain accurate and efficient stereology-based estimates of the number and size of biological objects (e.g., cells) in tissue sections.

A method according to the present invention can include providing an imager for capturing a Z-stack of images of a three-dimensional (3D) object, the Z-stack of images being a sequence of images of the 3D object captured in increments having a step size along a z-axis of the 3D object; constructing extended depth of field (EDF) images from the Z-stack of images; performing a segmentation method on the EDF images including estimating a Gaussian Mixture Model (GMM), performing morphological operations, performing watershed segmentation, constructing Voronoi diagrams and performing boundary smoothing; and determining one or more stereology parameters such as number of cells in a region.

An embodiment of the present invention includes a method for performing computerized stereology. The method can include constructing extended depth of field (EDF) images from the Z-stack of images; performing clump segmentation on the EDF images by binarizing the EDF images using a threshold determined by estimating a Gaussian Mixture Model to pixel intensities; preprocessing the EDF images by converting the EDF images into grayscale and opening by reconstruction followed by closing by reconstruction; performing watershed segmentation on the EDF images, wherein regional minimas are extracted as foreground markers and boundaries between regions are used as background markers, and the watershed segmentation is applied using the background and foreground makers that overlap with clumps; constructing Voronoi diagrams and smoothing, including constructing a Voronioi map using centers of foreground regions and refining region boundaries using a Savitzy-Golay filter, and determining one or more stereology parameters, such as number and size of cells in a region.

BRIEF DESCRIPTION OF THE DRAWINGS

FIGS. 1(a)-1(i) show intermediate results of different steps in segmentation-stereology according to the present invention. FIG. 1(a) shows an original image with manual counts. FIG. 1(b) shows an EDF image used by a segmentation method according to the present invention. FIG. 1(c) shows clumps segmented using the threshold computed from an estimated Gaussian Mixture Model (GMM). FIG. 1(d) processed EDM image.

FIG. 1(e) shows regional minimas in the processed image. FIG. 1(f) shows background markers for watershed segmentation. FIG. 1(g) shows watershed regions reconstructed by regional minimas. FIG. 1(h) shows a Voronoi diagram produced from foreground regions in each segmented clump. FIG. 1(i) shows final segmentation after smoothing region boundaries using a Savitzky-Golay filter.

FIG. 2(a) shows extended depth of field (EDF) images (right) created from z-stack of images (left) with a low power objective (40×, na 0.65).

FIG. 2(b) shows extended depth of field (EDF) images (right) created from z-stack of images (left) with a high power objective (100×, na 1.3).

FIGS. 4(a)-(e) are plots of manual and automated cell counts of different tissue sections.

FIG. 5(a) shows two EDF images with variable brightness.

FIG. 5(b) shows the same two EDF images as FIG. 5(a), after segmentation. Additionally, the Figure shows two EDF images from a histology section showing variable brightness.

FIGS. 6A-6D shows step-wise results of EDF image processing using an automatic stereology framework according to the present invention. FIG. 6(a) shows nucleus segmentation. FIG. 6(b) shows cell clump segmentation. FIG. 6(c) shows cytoplasm approximation. FIG. 6(d) shows cytoplasm refinement.

FIG. 7 shows Algorithm 1, which is an automatic stereology framework according to the present invention.

FIG. 8 shows a list of equations that can be used in an automated stereology framework according to the present invention.

FIG. 11 shows a schematic of a fine refinement step according to the present invention.

FIG. 12 shows Corpuscle problem.

DETAILED DISCLOSURE OF THE INVENTION

Figure 3:
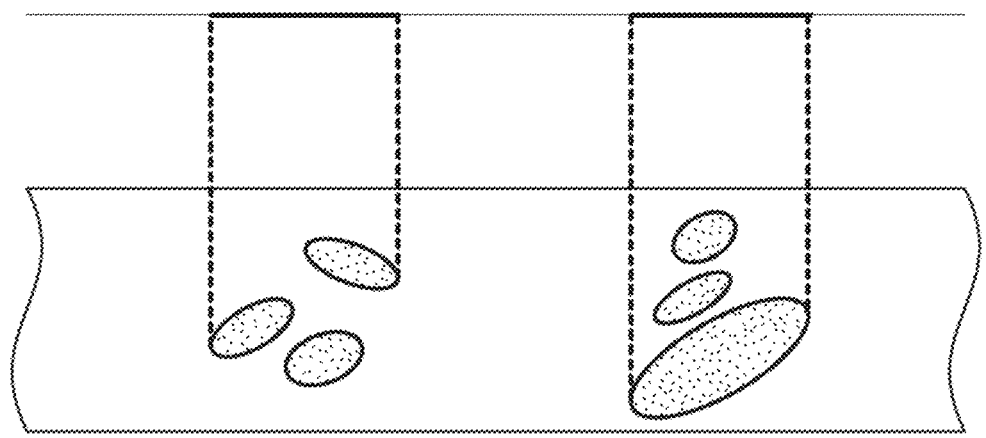
FIG. 3 is a schematic of NeuN-stained soma in a thick section at low power (showing over-projection on left and masking on the right) and also shows a schematic of high signal-to-noise objects in a thick section showing over-projection (left) and masking (right).

Embodiments of the present invention include systems and methods for automated stereology. Embodiments of the present invention include an automatic optical fractionator that can obtain accurate and efficient stereology-based estimates of the number and size of biological objects (cells) in tissue sections. Used in combination with segmentation algorithms and immunostaining methods, automatic estimates of cell number and size (volume) are obtainable from extended depth of field images built from three-dimensional volumes of tissue (disector stacks).

Embodiments of the present invention include a novel combination of extended depth of field (EDF) images that give 2-D representations of 3-D cells in a disector volume at their optimal plane of focus, and the application of segmentation algorithms to these EDF images in order to automatically make unbiased (accurate) determinations of the true number and size (volume) of cells visualized by staining. A variety of staining methods can be applied, which are known in the art. By increasing the sampling stringency, the automatic estimates of cell number and size will approach their true value. The segmentation method can include a combination of Gaussian Mixture Model (GMM), morphological operations, watershed segmentation, Voronoi diagrams and boundary smoothing, though it is recognized that equivalent segmentation algorithms could achieve a similar result. The application of a segmentation algorithm to EDF images allows for automatic estimates of object number and size in disector volumes that represent a known fraction of a reference space, hence the designation automatic optical fractionator.

Embodiments of the present invention can include a step of nucleus detection and segmentation. FIG. 6 shows a series of processing steps performed on an EDF image.

In nucleus detection and segmentation, the primary goal is to detect and segment nuclei commonly represented by small uniform relatively dark and convex regions. Because each segmented nucleus is an indication of a cell, the result of this step directly affects the outcome of the final cytoplasm segmentation. The three most visually distinctive and important features of nuclei are size, average intensity and solidity, which can be used in iterative algorithms of the present invention to detect and segment nuclei. Due to the cytoplasm segmentation methods of the present invention, minor segmentation inaccuracies in this step will have only negligible effects on the final results. Finally, since nuclear detection inaccuracy has more adverse effects on the final segmentation outcome, algorithms of the present invention can be designed to have high sensitivity to nuclei. The suggested method (or algorithm) for this task is a novel iterative approach for detecting (and segmenting) nuclei, and the method will now be further explained.

An EDF image can first be blurred using a 2-D adaptive noise-removal filter. An algorithm of the present invention can then iteratively binarize the image starting with a low threshold to find seed points from different nuclei. Too small or too concave regions can be removed after each binarization and remaining regions can be added to a nucleus mask. The nucleus mask can keep the nuclei segmented at each execution phase of the algorithm. A region replaces previous regions only if it has greater solidity than all the previous region(s) that overlap with it. This ensures that a newly appearing region does not replace other more convex region(s). The thresholding range can be decided based on the minimum and maximum average intensity of a typical (or average) nucleus in the images. The image can also be iterated in multiple steps (e.g., steps of 10) for faster computation.

Two post-processing steps can also be incorporated. In the two post-processing steps, some or all regions can be dilated and filtered. Those regions having a difference between their outer boundary average intensity and region average intensity that is smaller than a threshold can be removed. It should be noted that most of the artifacts can be ignored because of their size (if they are isolated) or because of their solidity (if they are overlapping). Although the algorithm is simple and fast, it is also very accurate on both synthetic and real image datasets and can outperform other state-of-the-art algorithms.

FIG. 7 shows an example of an algorithm (Algorithm 1) according to the present invention. Filtering regions based on a maximum size can be considered, as seen in line 6 of Algorithm 1. The filter can increase segmentation accuracy but should not change the results for nucleus detection accuracy on previous cytology datasets. The nucleus, represented by region A in ground truth, is considered to be detected by region B in the segmentation results by the rule in Equation 11 of FIG. 8.

According to the present invention, clump segmentation can follow nucleus detection and segmentation. In clump segmentation, the cell clumps (cellular masses that contain urothelial cells) are segmented from the background. Generally, the background in each EDF image is uniformly bright and the pixels of the foreground are darker, but have more variation. This contrast causes the brightness of the darkest background pixel to be intrinsically higher than the brightest foreground pixel, although this is not always the case. Therefore, a simple thresholding and some morphological operations can segment the background from the foreground.

According to an embodiment of the present invention, the algorithm learns a Gaussian Mixture Model (GMM) with two components on the pixel intensities using an Expectation Maximization (EM) algorithm. One Gaussian can estimate the distribution of foreground (cell clumps) pixel intensities and the second can estimate the background pixel intensities. Using the background Gaussian distribution, the threshold $T=Q(q)$, where $Q(.)$ is selected as the quantile function of the normal distribution, which can be defined as in Equation 1 (FIG. 8), where $\mu b$ and $b$ are the mean and standard deviation of the background normal distribution and $erf(.)$ is the error function.

Figure 9:
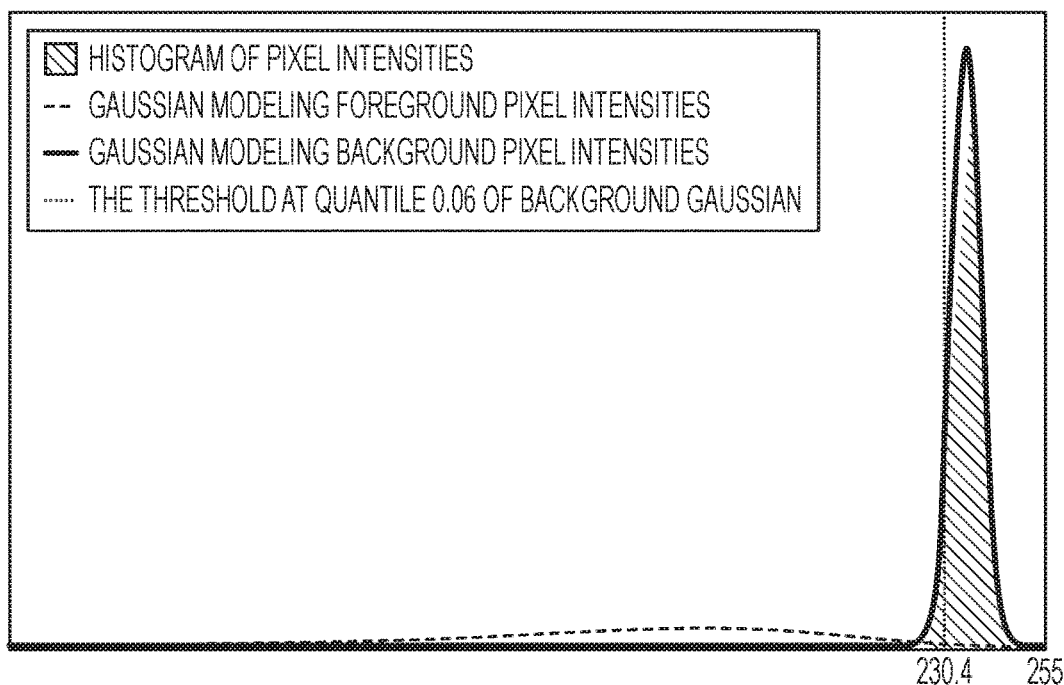
FIG. 9 shows a histogram of pixel intensities of a real EDF image, its corresponding estimated GMM and a selected threshold.

FIG. 9 shows a histogram of pixel intensities of a real EDF image, its corresponding estimated GMM and the selected threshold. After an image is binarized using the threshold T, a connected component analysis can be performed. Those connected components that did not contain any nucleus, or have small areas, or an average intensity greater than $Q(q0)$ can removed. Alternatively, those nuclei that do not overlap with any segmented cell clump can be discarded.

After clump segmentation, cytoplasm segmentation can be performed, which involves segmenting the overlapping cytoplasm. Generally the best focal plane for a specific cell is found when its nucleus is in focus. Therefore, it can be safely assumed that a nucleus is in focus when its cytoplasm is also (at least relatively) in focus, and vice versa. Based on this assumption, a cytoplasm boundary of a nucleus can be approximated by assigning the parts of the image that have focal measurements that are similar to the nucleus and are relatively close. These two criteria (being relatively close to the nucleus and having similar focal measurements to that of the nucleus) are the main criteria with which to approximate the cytoplasm boundaries using the image stack. After approximating the boundary, the boundaries can be refined in two more steps using the EDF image.

To approximate the cytoplasm boundaries, a square grid with width W can be overlaid on each image in the stack. Instead of assigning pixels of the image to different nuclei, the boundaries can be approximated by assigning grid squares (or subimages). This can increase computational speed and also allows for defining a focus measure to estimate the focus of the area enclosed in a grid square. Based on the above assumption, if two subimages that are near in distance come into focus and go out of focus similarly in different images of the image stack, then it is likely they belong to the same cell. This will give an approximation of cytoplasm boundaries.

Considering the (i,j)-th grid square (that is in row i and column j). For image k in the stack, the focus measure of Ik ((i,j)-th grid square in k-th image in the stack), Fk, can be defined as the standard deviation of pixel intensities in the grid square. A focus vector of (i, j)-i,j-th grid square can be defined as the vector containing focus measures of all images in the stack, (F1, F2, . . . , F20) (assuming there are 20 images in each stack in the dataset). The focus vector can then be normalized to have values within the range [0,1] and be denoted by (F1, F2, . . . , F20).

The focus distance of the (i,j) and (i0,j0)-th grid squares, Si0,j0, can then be defined by the i,j Euclidean distance of their corresponding normalized focus vectors as shown in Equation 2 of FIG. 8. Equation 3 shows the measure of the closeness of (i,j) and (i0,j0)-th grid squares. Finally, the likelihood of the (i,j) and (i0,j0)-th grid squares belonging to the same cell can be estimated by Equation 4.

Using the likelihood measure, L, defined above for two subimages belonging to the same cell, the likelihood of a subimage belonging to the cytoplasm of a particular cell is estimated by considering the fact that its nucleus is part of the cell. Therefore, to find out which subimages are a part of a particular cell, a search is done for subimages that have a high likelihood of belonging to the same cell with the subimages overlapping with the nucleus. Hence, to compute the likelihood of the (i,j)-th subimage belonging to the cytoplasm of a cell with a nucleus that overlaps with (i1, j1), (i2, j2), . . . , (im0, jm0)-th subimages, we set m as the index of the detected nucleus in a cell clump (Equation 5). Lastly, if there are N nuclei detected in a cell clump, namely nucleus 1 through N, the (i,j)-th subimage can be assigned to nucleus m as shown in Equation 6. In other words, a subimage is assigned as the cytoplasm of a cell if the weighted likelihood of it belonging to that cell is greater than the sum of the likelihoods of it belonging to other cells in the clump. The permitted degree of overlap between cells in a clump can be adjusted: higher values allow the cells in a cell clump to overlap more, and vice versa. In the next two processes that are described, the approximated boundaries are refined.

Figure 10:
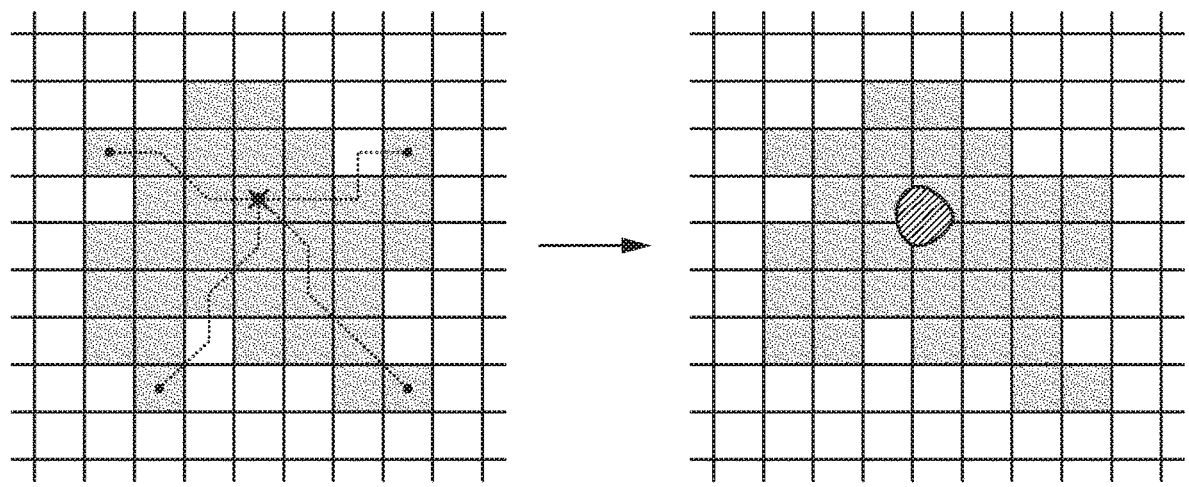
FIG. 10 shows a schematic of a coarse refinement step showing removal of subimages not reachable by a centroid subimage.
Figure 13:
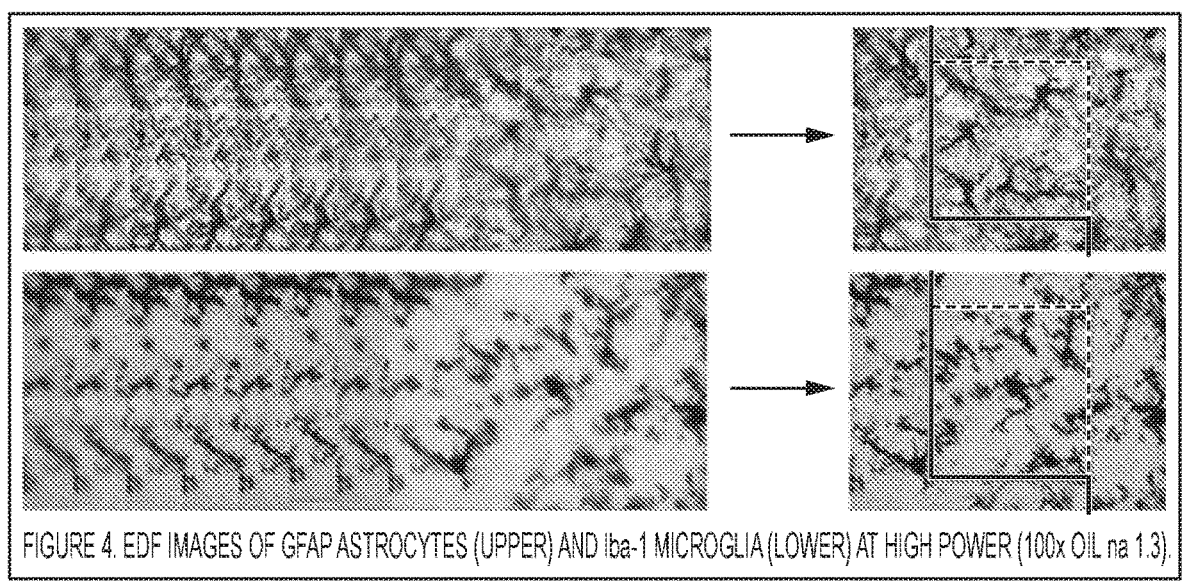
FIG. 13 shows EDF images of GFAP astrocyltes (upper) and the Iba-1 microglia (lower) at high power (100× oil na 1.3).

The first step of refining the approximated boundaries can include coarse refinement, which is defined as refining the boundary at the subimage level. Unlike nuclei, which are mostly convex, the shape of cytoplasm can show substantial concavity. Therefore, enforcing convexity on cytoplasm boundaries is not realistic, though a limited level of concavity can be allowed in cytoplasm boundaries. To accomplish this, reachability notation can be defined and grid squares that are not reachable from the nucleus centroid can be removed. For example, suppose that the nucleus centroid falls in the (i,j)-th grid square, it can be assumed that the (i0,j0)-th grid square is not reachable from the (i,j)-th grid square if there is at least one grid square on the discretized line segment from (i,j) to (i0,j0) that is not assigned to the cell. Discretization can be implemented using the fast and simple algorithms that are known in the art (and outlined in the References, below). Removing a grid square may make previously reachable grid squares not-reachable. Not-reachable grid squares can continue to be removed as long as such grid squares exist. FIG. 10 shows an example of two removed unreachable grid squares for a cell and its final shape.

The second step of refining the approximated boundaries can include fine refinement, which refines the boundary at the pixel level. Fine refinement at the pixel level can be conducted in an iterative process. The effect of nuclei on the boundary evolution can be removed by replacing each nucleus region's pixel intensity by the mean intensity of its outer boundary. This operation can result in smoothing the segmented nuclei regions significantly and inhibiting edge pixels caused by nuclei from attracting the boundaries.

Moving from a pixel outside the cell towards the centroid of its nucleus creates a transition from a (relatively) bright to a darker pixel at the time of entering the area of the cell (at the cytoplasm boundary). The first phase of each iteration can find such locations. However, finding the correct locations is often not an easy task because (1) these edge pixels are not always easily detectable because of low contrast and signal to noise ratio; and (2) the presence of artifacts and non-cells create spurious edges. The first issue can be addressed with a filter that smooths the transition locations using the calculated transition locations before and after. This step ensures that if enough edge pixels are detected correctly, a missing/incorrectly detected edge pixel will be recovered. To minimize the adverse effect of spurious edges in the first phase of each iteration, a rougher smoothing filter can be used to smooth those values and others values further from their smoothed values. The filter can be applied again to remaining values and the new estimated values are used to refine the boundary. A weight vector can also be defined to give a higher preference to edge pixels in the vicinity of the refined boundary at the previous iteration, or at approximated boundary from previous coarse refinement step. The details this step will now be discussed.

Suppose that the boundary contains pixels of coordinates (cx+rΘ cos Θ, cy+rΘ sin Θ), for Θ=0, 1, . . . , 359, where (cx, cy) are the coordinates of the nucleus centroid. In the first iteration, for each Θ∈{0, 1, . . . , 359}, a weight vector is defined (Equation 7) that contains the values of the composite of a sigmoid function with the normalized distance of points on the radial from the boundary point. A pixel corresponded to radius Θ and stride s, $p^s\Theta$ has the coordinates ($c_x$+s cos Θ, $c_y$+s cos Θ). The gradient at $p^s\Theta$, G($p^s\Theta$), is defined as shown (Equation 8) where I(p) is the intensity of pixel p. For strides larger than 2rΘ and for strides smaller than 0, the intensity is respectively set to a maximum or minimum. For each Θ∈{0, 1, . . . , 359}, $p'^\Theta$ is selected as the edge pixel (Equation 9).

After choosing the sequence of points on the boundary, the x-coordinates can be smoothed. To filter out the spurious edge pixels after the first smoothing, those pixels that have a distance greater than a threshold from their smoothed estimation can be discarded. The filter can be applied again to the remaining points and the new smoothed boundary can replace the previous estimated boundary. This can minimize the effect of the spurious or inaccurately selected pixels on the boundary evolution.

FIG. 11 shows how newly selected boundary points and smoothing affect the previous boundary of a cell in a synthetic image. The only difference between the first iteration and the following iterations is that in the following iterations the strides in Equation 7 are only considered from 0 through re. Therefore, in the first iteration the area may grow, but after that it only can shrink. Inflation in iterations other than the first iteration can be restricted because, if there are no strong edge pixels due to poor contrast, the boundaries usually expand until they reach to the cell clump boundary.

The iterations can continue until the ratio of the size of non-overlapping area (between the new and previous areas) to the size of previous area is negligible (e.g., less than 0.01). Except for a few parameters, e.g., minimum and maximum sizes for nuclei and cytoplasm, most of the parameters in the segmentation algorithm are set in an automatic and adaptive manner separately for each image, making the results of the automatic framework consistent with variations in image acquisition. An important factor that favors the accurate detection and segmentation of cells in each image stack is that the segmentation algorithm has been specifically designed to be resistant to low contrast. As part of the procedures for optimizing the present invention, a consistent mid-level of illumination can be determined. Because images collected in datasets will have varying brightness, intensity thresholds can be set adaptively by the estimated GMM for each image, allowing the algorithm to generate consistent segmentations for different cell types, staining intensities and microscope settings that cause brightness variation at the image and neuron levels under brightfield illumination, as seen in FIG. 5.

Embodiments of the subject invention provide an automation platform for scientists, such as neuroscientists, to complete unbiased stereology studies with greater accuracy, precision, speed, and lower costs. In some embodiments, the automatic stereology of the invention can use machine learning, including deep learning from a convolutional neural network (CNN) and adaptive segmentation algorithms (ASA) to segment stained cells from EDF images created from 3-D disector volumes. In other embodiments, the automatic stereology of the invention uses a deep belief network (DBN), including a forward propagating network comprising an input layer, a plurality of hidden layers, and an output layer. When used in neurological applications, the embodiments of the subject invention provide that the entire process from outlining a region of interest to providing results can take less than 30 minutes per brain. Compared to subjective counting with manual stereology, studies with the automatic stereology of the invention show greater accuracy and negligible variation from non-biological sources.

The CNN can include a convolutional layer, a Rectified Linear Unit (ReLU) layer, a pooling layer, and a fully connected (FC) layer. The convolution layer can comprises a plurality of filters configured to detect features of an input image. Each filter can share the same biases and weights, and analyze the same number of input neurons. The filter can convolve across the dimensions of the input image and compute a dot product of the filter and the image subset in order to generate a matrix or feature map. The convolution process can preserve the spatial relationship between the pixels. This process can be repeated for each filter in the convolution layer. In order to account for real world non-linearity, a Rectified Linear Unit (ReLU) operation can apply an activation function to the matrix to introduce a non-linear element to the matrix or image, as convolution is a linear operation. In order to reduce the number of parameters and computation in the CNN, a pooling layer can be inserted after the ReLU operation to reduce the dimensions of each matrix or feature map. The output matrix or image of the pooling layer can then be treated as an input image of a convolution layer. The above described basic steps of the CNN can be repeated to extract the desired output. The output of the final pooling layer can be an input for a Fully Connected (FC) Layer. The CNN can learn to count cells through the different methods including backpropagation, in which known images with known cell or target object counts are processed through the CNN and the accuracy or the error of the output can be recorded. If the cell number count provided by the CNN exhibits poor accuracy or high error, parameters can be adjusted to increase the accuracy of the CNN.

In some specific neurological applications, the invention provides automatic counts of immunostained neurons and glial cells in neocortex and CA1 of brains, such as mice and human brains. By removing manual stereology as the major obstacle to progress for many basic neuroscience and pre-clinical research studies, the automated stereology of the invention provides of novel strategies for therapeutic management of neurological diseases and mental illnesses.

In a semi-automatic mode of the invention, automatic stereology can provide a confirmation step following segmentation by an ASA and prior to deep learning by the CNN. The system can be additionally configured to permit a system user to manually count cells and override a processor generated determination of the cell count.

Previous applications of automatic image analysis of neural elements have focused on 2-D images on thin tissue sections. Conceptually, this approach is semi-quantitative because it cannot make accurate (unbiased) estimates of cell number due to sampling bias from the Corpuscle Problem (FIG. 12). The number of 2-D profiles (right) on a cut surface that appear by a knife passing through 3-D objects (left) is not equal to the true number of objects (left) because of bias related to the cell size, shape and orientation. According to the disector principle, unbiased stereology overcomes this bias by quantifying 3-D cells within a known volume. Similarly, the FAST approach overcomes this bias using EDF images. The EDF algorithm captures each cell in disector volumes at its maximum plane of resolution and then projects each cell onto an artificial 2-D plane (see, for example, FIG. 2b), EDF images of NeuN immunostained neurons). As a result, the cell number on the EDF image equals the true number of cells in the disector volume. The use of unbiased counting rules (exclusion planes) avoids bias due to edge effects. Combining ASA for segmenting NeuN-stained neurons is a first-in-class use of EDF images for unbiased stereology. Neural networks have been used to solve a variety of problems and tasks in different industries (Speech & Image Recognition, Marketing, Retail & Sales, Banking & Finance) with a large and increasing number of image analysis applications to biomedical problems. Certain embodiments of the invention provide application of a CNN to segment immunostained neurons, astrocytes, and microglia cells on high resolution EDF images for unbiased stereology of cell number. To reduce time and effort for generating ground truth for training the model, ASA is applied to train the model. For this approach the annotations are created by preprocessing images of immunostained cells on EDF images, learning a Gaussian Mixture Model on each individual image, thresholding and post-processing the images. An end user can manually edit the segmented image to create a sophisticated training dataset for training the neural network. Importantly, this confirmation step in the creation of the training dataset will also address customer needs to interact with the data collection process, as opposed to accepting fully automatic results.

The number of cells within each disector can be determined and used for calculation of total cell number using the unbiased optical fractionator method. According to this approach for scaling from local (disector) to region (cortex, CA1) levels, as sampling increases the estimate of neuron number progressively converges on the true value. Once the sampling error is sufficiently low, e.g., coefficient of error (CE) less than 10% (CE<0.10), the estimate will be considered stable. To achieve optimal estimates, sampling stringencies for cells and disectors can be determined within each region. As such, the invention provides employing a combination of ASA/CNN to segment neural elements for stereology analysis.

Certain embodiments of the invention provide an effective segmentation method for different neural elements stained with different colorimetric protocols and in brain regions with different packing densities. To overcome this barrier, CNN can be used (Unet) to segment neurons that are immunostained with high signal:noise (S:N) immunomarkers, e.g., NeuN for neurons, and then tune this CNN to segment microglia and astrocytes stained with similarly high S:N immunostains (Iba-1 and GFAP, respectively).

In other embodiments separate ASAs are developed and optimized for each neural element (neurons and glial cells) immunostained with defined staining protocols. Both approaches allow for a range of pre- and post-processing steps, leading to increased confidence that the technical risks can be overcome using CNN, ASAs, or a combination of the two.

Figure 20:
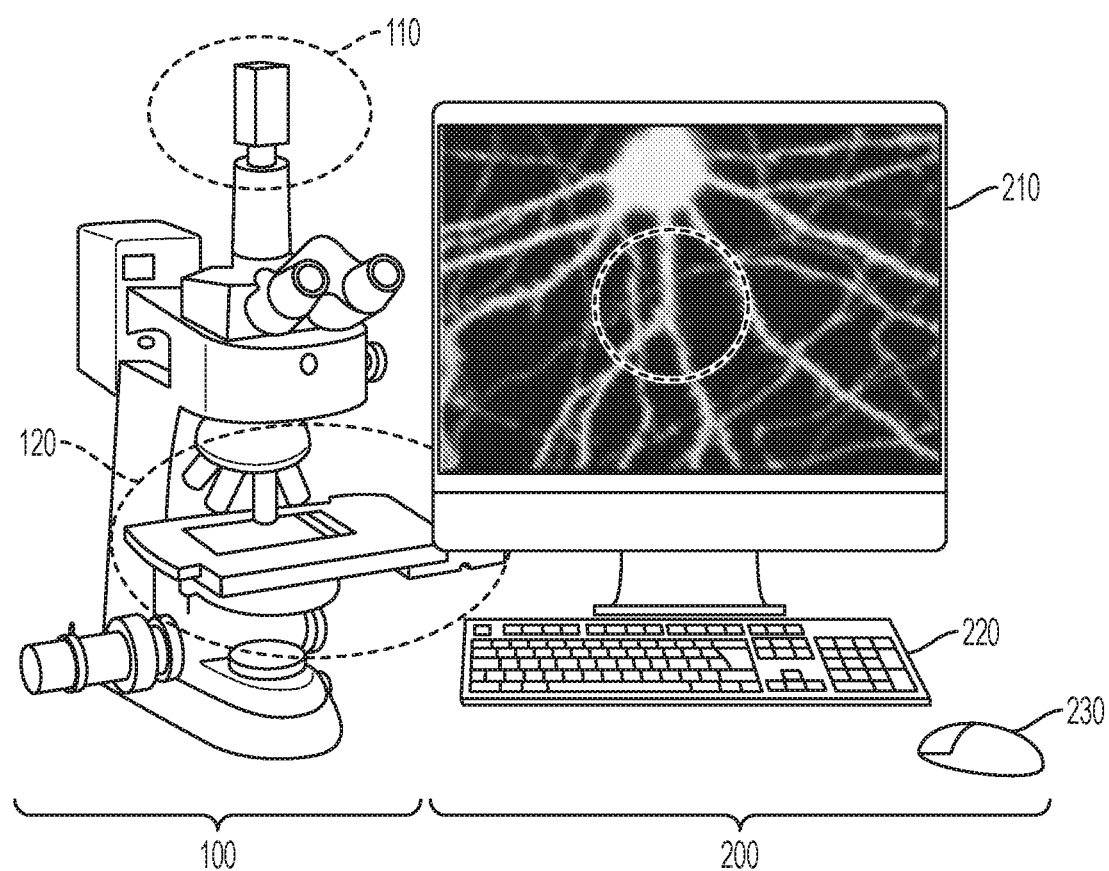
FIG. 20 shows an image of a stereologer system according to an embodiment of the subject invention.

FIG. 20 shows an example stereologer system that may be used to implement features described above with reference to FIGS. 1-19. The stereology system includes a microscope 100, a digital camera 110, a motorized stage 120, x, y, and z axis motors, a dual stage micrometer, a digital imaging system, a processor, a memory device, a communication interface connecting the microscope and a computer readable medium, a computer 200, a high definition monitor 210, a keyboard 220, and a mouse 230.

The communication interface connecting the microscope and the computer readable medium can be, for example, a communications port, a wired transceiver, a wireless transceiver, and/or a network card. The communication interface can be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

Embodiments of the stereologer system of FIG. 20 may be configured to perform any feature or any combination of features described herein. In certain embodiments, the computer readable medium may store instructions which, when executed by the processor, cause the processor to perform any feature or any combination of features described above.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

Although FIG. 20 shows that the stereology systems includes a single microscope 100, a single digital camera 110, a single motorized stage 120, a single computer, 200, a single display 110. A single keyboard 120, and a single mouse 230, the stereologer system may include multiples of each or any combination of these components, and may be configured to perform, analogous functionality to that described herein.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method for performing computerized stereology, comprising:
  providing an imager for capturing a Z-stack of images of a three-dimensional (3D) object, the Z-stack of images being a sequence of images of the 3D object captured in increments having a step size along a z-axis of the 3D object;
  constructing extended depth of field (EDF) images from the Z-stack of images;
  performing a segmentation method on the EDF images including estimating a Gaussian Mixture Model (GMM), performing morphological operations, performing watershed segmentation, constructing Voronoi diagrams and performing boundary smoothing; and
  determining one or more stereology parameters.

Embodiment 2

A method for performing computerized stereology, comprising:
  providing an imager for capturing a Z-stack of images of a three-dimensional (3D) object, the Z-stack of images being a sequence of images of the 3D object captured in increments having a step size along a z-axis of the 3D object, wherein the 3D object is a tissue sample;
  constructing extended depth of field (EDF) images from the Z-stack of images;
  performing a segmentation method on the EDF images including nucleus detection and segmentation, clump segmentation, cytoplasm segmentation, boundary approximation, course refinement, and fine refinement; and
  determining one or more stereology parameters.

Embodiment 3

The method for performing computerized stereology of embodiment 2, wherein the nucleus detection and segmentation includes blurring the EDF images using a 2-D adaptive noise-removal filter, and iteratively binarizing the EDF images starting with a low threshold to find seed points from different nuclei.

Embodiment 4

The method for performing computerized stereology of according to any of embodiments 2-3, wherein the nucleus detection and segmentation includes removing small and concave regions after each binarization and adding remaining regions to a nucleus mask.

Embodiment 5

The method for performing computerized stereology of according to any of embodiments 2-4, wherein the nucleus mask keeps nuclei segmented at each execution phase of the segmentation method.

Embodiment 6

The method for performing computerized stereology of according to any of embodiments 2-5, wherein the clump segmentation includes learning a Gaussian Mixture Model (GMM) with two components on pixel intensities using an Expectation Maximization (EM) algorithm.

Embodiment 7

The method for performing computerized stereology of according to any of embodiments 2-6, wherein a first Gaussian estimates a distribution of foreground pixel intensities and a second estimates background pixel intensities.

Embodiment 8

The method for performing computerized stereology of according to any of embodiments 2-7, wherein cytoplasm segmentation includes approximating a cytoplasm boundary of a nucleus by assigning parts of the EDF images that have a focus measure similar to the nucleus and are relatively close.

Embodiment 9

The method for performing computerized stereology of according to any of embodiments 2-8, wherein the course refinement includes applying a grid to the EDF images, and applying a limited level of concavity by defining reachability notation and removing grid squares that are not reachable from a nucleus centroid, followed by discretization.

Embodiment 10

The method for performing computerized stereology of according to any of embodiments 2-9, wherein the fine refinement includes a pixel level iterative process and replacing each nucleus region's pixel intensity with a mean intensity of the nucleus region's outer boundary.

Embodiment 11

A method for performing computerized stereology, comprising:
  providing an imager for capturing a Z-stack of images of a three-dimensional (3D) object, the Z-stack of images being a sequence of images of the 3D object captured in increments having a step size along a z-axis of the 3D object;
  constructing extended depth of field (EDF) images from the Z-stack of images;
  performing clump segmentation on the EDF images by binarizing the EDF images using a threshold determined by estimating a Gaussian Mixture Model to pixel intensities;

preprocessing the EDF images by converting the EDF images into grayscale and opening by reconstruction followed by closing by reconstruction;

performing watershed segmentation on the EDF images, wherein regional minimas are extracted as foreground markers and boundaries between regions are used as background markers, and the watershed segmentation is applied using the background and foreground makers that overlap with clumps;

constructing Voronoi diagrams and smoothing, including constructing a Voronoi map using centers of foreground regions and refining region boundaries using a Savitzy-Golay filter; and determining one or more stereology parameters.

Embodiment 12

The method for performing computerized stereology of embodiment 11, wherein the clump segmentation includes segmenting clumps of regions in the EDF images by a GMM with two components estimated based on pixel intensities using an Expectation Maximization Algorithm.

Embodiment 13

The method for performing computerized stereology of according to any of embodiments 11-12, wherein the preprocessing includes smoothing the EDF images and removing small dark or bright regions.

Embodiment 14

The method for performing computerized stereology of according to any of embodiments 11-13, wherein the preprocessing includes connecting relatively close regions and removing small region minimas.

Embodiment 15

The method for performing computerized stereology of according to any of embodiments 11-14, wherein the foreground and background markers are region minimas extracted from preprocessed EDF images.

Embodiment 16

The method for performing computerized stereology of according to any of embodiments 11-15, wherein the watershed segmentation expands original regional minimas to give a better approximation of neuron boundaries.

Embodiment 17

The method for performing computerized stereology of according to any of embodiments 11-16, wherein the constructing Voronoi diagrams and smoothing includes not splitting a region if the region's size is less than a maximum threshold and solidity of the region obtained by the refined boundary of an original region is greater than an average solidity of all regions.

Embodiment 18

The method for performing computerized stereology of according to any of embodiments 11-17, wherein the constructing Voronoi diagrams and smoothing includes not splitting a region if the region's size is less than a maximum threshold and solidity of the region obtained by the refined boundary of an original region is greater than an average solidity of all regions.

Embodiment 19

The method for performing computerized stereology of according to any of embodiments 11-18, wherein in determining a number of cells, segmented regions are removed that do not overlap with a region of interest or overlap exclusion lines of a disector frame.

Embodiment 20

The method for performing computerized stereology of according to any of embodiments 19, wherein a total number of cells (N) is determined according to the following equation:

$$\text{Total } N = [\Sigma Q-] \cdot F1 \cdot F2 \cdot F3$$

wherein F1 is the reciprocal of the section sampling fraction (ssf); F2 is the reciprocal of the area sampling fraction (asf); and F3 is the reciprocal of the thickness sampling fraction (tsf).

Embodiment 21

The method of performing computerized stereology of embodiment 20, further comprising providing a processor in operable communication with a computer-readable medium, wherein the instructions stored on the computer readable-readable medium, when executed, cause the processor to:
generate a three dimensional computer simulation of the three-dimensional object;
generate an x-stack of sections being a sequence of sections of the three dimensional computer simulation captured in increments having a step size along a x-axis of the three dimensional computer simulation; and
determine a number of cells contained in the three dimensional simulation from a x-direction.

Embodiment 22

The method of performing computerized stereology of embodiment 21, further comprising
providing a processor in operable communication with a computer-readable medium,
wherein the instructions stored on the computer readable-readable medium, when executed, cause the processor to:
generate a three dimensional computer simulation of the three-dimensional object;
generate an y-stack of sections being a sequence of sections of the three dimensional computer simulation captured in increments having a step size along a y-axis of the three dimensional computer simulation; and
determine a number of cells contained in the three dimensional simulation from a y-direction.

Embodiment 23

A method for computerized stereology, the method comprising
providing a providing an imager of a Z-stack of images of a three-dimensional (3D) object, the Z-stack of images being a sequence of images of the 3D object captured in increments having a step size along a z-axis of the 3D object;

providing a processor in operable communication with a computer-readable medium, wherein the instructions stored on the computer readable-readable medium, when executed, cause the processor to:

access a deep learning structure retained in the computer-readable medium, wherein the deep learning structured model comprises a plurality of layers with weights and biases assigned thereto; and configuring the deep learning structured model to:
construct extended depth of field (EDF) images from the Z-stack of images;
perform clump segmentation on the EDF images by binarizing the EDF images using a threshold determined by estimating a Gaussian Mixture Model to pixel intensities;
preprocess the EDF images by converting the EDF images into grayscale and opening by reconstruction followed by closing by reconstruction;
perform watershed segmentation on the EDF images, wherein regional minimas are extracted as foreground markers and boundaries between regions are used as background markers, and the watershed segmentation is applied using the background and foreground makers that overlap with clumps;
construct Voronoi diagrams and smoothing, including constructing a Voronoi map using centers of foreground regions and refining region boundaries using a Savitzy-Golay filter; and
determine one or more stereology parameters.

Embodiment 24

The method of embodiment 23, wherein the deep learning structure is a convolutional neural network.

Embodiment 25

The method of embodiment 24, wherein the convolutional neural network comprises a plurality of convolutional layers, Rectified Linear Unit (ReLU) layers, pooling layers, and a fully connected (FC) layer.

Embodiment 26

The method according to any of the embodiments 23-25, wherein the convolutional neural network comprises:
19 convolution layers, 4 max pooling layers, and 4 up-sampling convolution layers.

Embodiment 27

The method of performing computerized stereology according to nay of embodiments 23-26, further comprising:
further configuring the deep learning structure to:
generate a three dimensional computer simulation of the 3D object;
generate an x-stack of sections being a sequence of sections of the three dimensional computer simulation captured in increments having a step size along a x-axis of the three dimensional computer simulation; and
determine a number of cells contained in the three dimensional simulation from a x-direction.

Embodiment 28

The method of performing computerized stereology according to any of embodiments 23-27, further comprising:
further configuring the deep learning structure to:
generate a three dimensional computer simulation of the three-dimensional object;
generate an y-stack of sections being a sequence of sections of the three dimensional computer simulation captured in increments having a step size along a y-axis of the three dimensional computer simulation; and
determine a number of cells contained in the three dimensional simulation from a y-direction.

Embodiment 29

The method of performing computerized stereology according to any of embodiments 23-28, further comprising:
providing a processor in operable communication with a computer-readable medium, wherein the instructions stored on the computer readable-readable medium, when executed, cause the processor to:
generate a three dimensional computer simulation of the three-dimensional object;
generate a Z-stack of section being a sequence of sections of the three dimensional computer simulated model captured in increments having a step size along a z-axis of the three dimensional computer simulation; and
determine a number of cells from a z-direction.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

The performance of a segmentation algorithm can be evaluated after the segmentation ground truth is collected. Results from ASM and ground truth were correlated along with other analytic metrics (see, for example, Table 1, below). One of the popular measures to evaluate the segmentation performance is the Dice Similarity Coefficient (DSC). For two regions, A and B, DSC(A,B) is defined as:

$$\frac{2|A \cap B|}{|A|+|B|},$$

where |.| is the area of the region. The Dice Similarity Coefficient (DSC) of two regions A and B is defined as shown in Equation 10 of FIG. 8. Other evaluation metrics include False Negative Rate at object level (FNRo), True Positive Rate at pixel level (TPRp) and False Positive Rate at pixel level (FPRp). A segmented cell in the ground truth is considered missed if there is no region in the segmentation result that has a DSC greater than 0.7. FNRo is the rate of cells missed in the ground truth and TPRp and FPRp are the average of true positive and false positive rates, respectively, at pixel levels of those regions that are not missed.

From the viewpoint of algorithm segmentation, following adjustments to maxima and minima settings, the morphological characteristics of different cells are quite similar. It is expected that the automatic stereology framework will miss less than 5% of cells on average when the pairwise cell overlapping degree is not higher than 0.3. Prior to optimization, the algorithm is expected to detect nuclei with precision greater than 0.95 and recall greater than 0.90, and miss around 20% of cells in EDF images for a Dice Similarity Coefficient less than 0.7. The 20% miss rate is around half of the average miss rate reported for subjective assessments using conventional methods for manual stereology.

Example 2

All procedures for animal handling and use were approved by the USF Institutional Animal Care and Use Committee and followed NIH guidelines for the care and use of laboratory animals. Two Tg4510 male mice aged 6-8 months and two age- and sex-matched non-tg littermate controls were selected at random from the colony at the Byrd Alzheimer's Institute at the University of South Florida in Tampa, Fla. To validate the ASF for counting Neu-N immunostained neurons, the well-characterized Tg4510 line was chosen with responder and activator transgenes that drive expression of a P301L tau mutation under control of a tetracycline operon-responsive element. Rather than testing for a specific hypotheses related to tauopathies, neurodegeneration or neuroinflammation, this line of tg mice was selected because the brains show a wide range of neocortical cell morphologies under high power brightfield illumination, including normal and damaged neurons and resting/activated states of neuroglia cells.

Mice were deeply anesthetized on an isothermal pad and perfused with 25 ml of cold sterile buffered saline. Brains were removed and one hemisphere immersion fixed for 24 hours in freshly prepared phosphate buffered paraformaldehyde. After fixation, brains were transferred to Dulbecco's phosphate buffered saline and stored at 4° C. Prior to sectioning, brains were cryoprotected in 10, 20 and 30% sucrose. Frozen 50-μm sections were collected with a sliding microtome, transferred to 24 well plates in Dulbecco's phosphate buffered saline and stored at 4° C. One set of every $n^{th}$ section was sampled in a systematic-random to obtain 6-8 sections through each neocortex.

Sampled sections were immunostained with Neu-N antibodies for high S: N visualization of neurons. Sections from all animals were placed in a multi-sample staining tray and endogenous peroxidase was blocked (10% methanol, 3% $H_2O_2$ in PBS; 30 min). Tissue samples were permeabilized (with 0.2% lysine, 1% Triton X-100 in PBS solution) and incubated overnight in an appropriate primary antibody. Anti-NeuN (Millipore, Darmstadt, Germany) antibodies were used in this experiment. Sections were washed in PBS, and then incubated in corresponding biotinylated secondary antibody (Vector Laboratories, Burlingame, Calif.). The tissue was again washed after 2 h and incubated with Vectastain® Elite® ABC kit (Vector Laboratories) for enzyme conjugation. Finally, sections were stained using 0.05% diaminobenzidine and 0.03% $H_2O_2$. Tissue sections were mounted onto slides, dehydrated, and cover slipped.

An algorithmic variation was developed and optimized from an ensemble of segmentations algorithms and Seed Detection-Region Growing approaches. The purpose of the developed algorithm was to automatically segment high S: N neurons on EDF images. The numbers of neurons within disector volumes was used to calculate total neuron number in a reference volume using the unbiased optical fractionator method [Equation 1].

Since the regions of interest (neuronal cell bodies) have arbitrary sizes, shapes, and orientations, none of these features can be assumed a priori for either the segmentation step or quantification using unbiased stereology. The segmentation method applied was a combination of Gaussian Mixture Model (GMM), morphological operations, watershed segmentation, Voronoi diagrams and boundary smoothing, as detailed above. FIG. 1 shows the visual results of successive steps in the segmentation of an EDF image. Black regions are removed due to not overlapping with cells of interest, red regions are excluded due to overlapping with exclusion lines, and blue regions are neuron targets for automated counting. Green marks are manual marks inside blue regions, yellow marks are automated marks not counted manually, and red marks are missed manual marks. FIG. 1a shows a microscopy image with an unbiased disector frame used for manual counts. FIG. 1b is an EDF image constructed from the z-stack of images (disector stack) used for neuron segmentation. The final segmentation result is illustrated in FIG. 1i, where inclusion (green) and exclusion (red) lines shown in the original image are used by a manual optical disector and the automatic framework for counting neurons independent of their geometric properties (size, shape, and orientation).

Clumps of regions (Neu-N neuronal cell bodies) in the image were segmented by a Gaussian Mixture Model (GMM) with two components estimated based on pixel intensities using an Expectation Maximization (EM) algorithm. The image was binarized using a threshold computed by a background Gaussian quantile function value and morphological operations followed to extract the separate clumped neuron regions (FIG. 1c).

The image was preprocessed by morphological operations with opening by reconstruction followed by closing by reconstruction. These operations smooth the image and remove very small dark or bright regions (FIG. 1d) while connecting very close regions and removing very small region minimas.

After preprocessing, the image foreground and background markers were extracted for watershed segmentation. The foreground and background markers are region minimas extracted from the preprocessed image (FIG. 1e) and boundaries between regions of a watershed segmentation (FIG. 1f), respectively. Region minimas select for neurons and remove regions that do not fall into previously segmented neuron clumps.

The watershed segmentation was applied using the foreground and background markers previously described. One of the regions corresponded to the background and the others were foreground regions. Foreground regions that overlap with the map of segmented clumps were kept and the others discarded (FIG. 1g). This watershed segmentation usually expands original regional minimas and gives a better approximation of neuron boundaries. Lastly, each of the clump regions were split using the Voronoi diagrams obtained by the watershed regions within (FIG. 1h).

In the final step, the region boundaries were refined using Savitzky-Golay filter. This filter results in smoother boundaries and produces less concave regions. It was observed that a region containing a single neuron may be split into two or more subregions if more than one regional minima were detected. To diminish the adverse effect of such splits, a region was not split if its size was less than a maximum threshold and the solidity of the region obtained by the refined boundary of original region was larger than the average solidity of all regions obtained by the refined boundaries of subregions. For the final neuron count, segmented regions were removed that 1) do not overlap with the region of interest; or 2) overlap the exclusion lines of the disector frame. The number of remaining regions were chosen as the number of neurons that should be counted. This number summed across all sections [$\Sigma Q^-$] was used to estimate the total number of Neu-N immunopositive neurons [Total $N_{NeuN}$] by an optical fractionator formula:

$$\text{Total } N_{NeuN} = [\Sigma Q^-] \cdot F1 \cdot F2 \cdot F3$$

where F1 is the reciprocal of the section sampling fraction (ssf); F2 is the reciprocal of the area sampling fraction (asf); and F3 is the reciprocal of the thickness sampling fraction (tsf).

Example 3

An empirical study was carried out to determine optimal image magnification. Neu-N neurons were counted using manual stereology (ground truth) and the automatic framework on images collected at high power [100× Plan Fluorite, n.a. 1.3] and low power (40× Plan Acromat, n.a. 0.65) by the following procedure. At high power, a trained technician counted Neu-N neurons using the manual optical disector (ground truth) with assistance from the Stereologer system [Stereology Resource Center (SRC), Tampa, Fla.]. At the first random x-y location on the first section, Neu-N neurons were counted by thin focal-plane optical scanning through a 10-um high disector. Before moving to the next disector location, a stack of ten images about 1 um apart in the z-axis (so-called disector stacks) were captured and saved for analysis using the automatic framework. This process of manual optical disector counting and saving disector stacks was repeated at 200 to 300 systematic-random x-y locations across 7 systematically sampled sections through neocortex.

On completion, images in each disector stack were merged into a single synthetic Extended Depth of Field (EDF) image. Disector stacks combined into a single EDF image show all Neu-N neurons in focus, allowing the segmentation algorithm to be applied to a single high power image (see, for example, FIG. 2 (lower)). The above process was repeated at low power (40×), and a second set of disector stacks collected and EDF images created (see, for example, FIG. 1 (upper))]. In the analysis step, ground truth and algorithm counts for NeuN neurons were correlated for the purpose of assessing whether cells magnified by low or high power lens give superior results for the automatic framework. The lower right panel shows disector frame and outlines of NeuN neurons automatically counted by thin focal plane scanning and optical fractionator method.

There was a slightly better correlation ($R^2$=0.95, FIG. 2 upper) at low power (40×) between Neu-N neuron counts for ground truth and the automatic framework in the same disector volumes. The higher correlation for the low power images, however, does not reflect true (accurate) numbers of NeuN neurons in each disector volume due to over-projection and masking. As shown in FIG. 2, over-projection causes cells that overlap in the z-axis to be difficult to resolve as more than one cell. Also, larger cells in the z-axis can mask the presence of smaller ones, resulting in multiple cells that cannot be resolved as more than one. Both of these imaging artifacts arise from image capture using the high depth of field 40×40 lens. This view is supported by the fact that fewer neurons were counted by the low power lens (data not shown). In contrast, the results for Neu-N neuron counts using ground truth and the automatic framework on disector volumes captured at high power showed a slightly lower correlation [(R2=0.90, FIG. 2 (lower)]. Over-projection and masking artifacts in these disector volumes could be practically fixed by applying a modified segmentation algorithm with advanced post-processing steps, e.g., a classifier to indicate likely split or overlapping neurons. For images captured at low power, the same classifier approach could not resolve the correct number of neurons due to the high depth of field of the low power lens. Another argument in favor of high power is that the optical fractionator method requires section thickness measurements which are determined manually and automatically by thin focal plane scanning through the z-axis to find the upper and lower optical planes of each section. The high depth of field (thick focal plane) of the low power lens again inhibits precise localization of these optical planes. In contrast, the thin focal plane of the high power lens, which has twice the resolving power of the lower power lens, allows for precise localization of the upper and lower section surfaces. To ensure counts are accurate, therefore, both ground truth and ASF counts require high power magnification with a thin focal plane (low depth of field) objective lens.

Ground truth and automatic counts of Neu-N neurons were assessed in the same disector volumes using the following procedure. Six to 8 systematically sampled sections were prepared from each of two (2) Tg4510 mice (Tg-3, Tg-21) and two (2) non-tg controls (Ntg-2, Ntg-9). Two technicians with equivalent training and experience collected ground truth datasets using the manual optical disector (Gundersen et al., 1988 a,b). Sampling was carried out at sufficient x-y locations to achieve high sampling stringency (CE<0.05). As detailed above, after manual optical disector counting, disector stacks were collected in the z-axis for neuron counts by the automatic framework.

The counts of Neu-N neurons for disector stacks analyzed by ground truth and the automated framework were summed to give the neuron counts across 6 to 8 sections for each case (FIG. 4). Correlations between the automatic framework and ground truth were assessed by the coefficient of determination ($R^2$). Analysis of variation for total number of neocortical Neu-N neurons in the Tg4510 mice and non-tg controls was done by a two-tailed T-test with genotype as the independent variable and statistical significance at p<0.05.

Table 1 presents the ground truth and automated counts and correlations for the sum of all 85 sections analyzed for 4 different cases. The average value for two data collectors was used for mouse 02 values.

TABLE 1

Neu-N neurons counts by ground truth vs. automatic stereology in the same disectors of different 4 mice*.

| Collector (C) | Mouse ID | Ground Truth | Auto. Count | $R^2$ |
|---|---|---|---|---|
| C1, C2* | 02 | 1249 | 1238 | >0.98 |
| C2 | 21 | 858 | 878 | >0.98 |
| C1 | 03 | 570 | 603 | >0.98 |
| C1 | 09 | 558 | 697 | >0.98 |

$R^2$ = correlation for manual and automatic counts.
*average counts between two collectors (C1 and C2) for the same brain.

Correlations for ground truth and the automated framework are shown in Table 2. The correlations show uniformly close relationships between Neu-N neuron counts by both approaches ($R^2$>0.98). Inter-rater reliability for ground truth was assessed by two technicians analyzing different systematic-random disector locations on the same sections through brain 02 ($R^2$=0.95; data not shown). The average value of both data collectors for this brain were used for comparison with results from the automatic framework.

FIGS. 4(a)-(e) are plots of manual and automated cell counts of different tissue sections. These plots of NeuN neuron counts by section show relative agreement between the objective automated framework and subjective manual counts by two data collectors (C1 and C2). The residual errors in these correlations arise from both approaches. FIG. 4 shows plots for the manual and automated counts for each of the 5 comparisons in Table 2. Results for counts of Neu-N immunostained neurons in neocortex of Tg4510 mice and non-tg controls are shown in Table 2. Comparison of mean Neu-N neuron counts by ground truth and the automatic framework showed a 7% difference for the non-tg mice and a 4% difference for Tg4510 mice. For the ground truth dataset, there was a 24% difference in neuron number ($p<0.11$, ns). This difference was slightly higher (27%) using the automatic framework, which did reach statistical significance ($p<0.04$).

TABLE 2

Comparison of ground truth (manual optical disector) and the automatic stereology framework (ASF) for total number (+/−SEM) of Neu-N neurons in neocortex of Tg4510 mice an non-Tg controls.

| Group | N | Ground Truth | | ASF | | % diff$_{NeuN}$ |
| --- | --- | --- | --- | --- | --- | --- |
| | | Mean Neu-N | SEM$_{NeuN}$ | Mean Neu-N | SEM$_{NeuN}$ | |
| Non-Tg (n = 2) | 2 | 1.30E+06 | 1.18E+5 | 1.39E+06 | 7.71E+04 | +7 |
| Tg4510 (n = 2) | 2 | 9.81E+05 | 2.76E+3 | 1.02E+05 | 1.41E+04 | +4 |
| % diff$_{NeuN}$ | | −24 | | −27 | | |

Since brightness varies at the image and neuron levels under brightfield illumination, intensity thresholds used for the segmentation step must be set adaptively. The GMM component of the algorithm is estimated by pixel intensities of each image separately. As shown in FIG. 5, the whole framework is resistant to brightness variation.

This validation study showed a high correlation ($R^2>0.98$) between the ASF and ground truth for Neu-N counts. With regard to throughput efficiency, the ASF required about 30 minutes to achieve a high level of sampling stringency (CE=0.05). In contrast, two moderately experienced technicians both required about 4 times longer (about 4 hours) using manual stereology to estimate Neu-N number to a comparable sampling stringency on the same sections. With regard to reproducibility, a single inter-rater comparison showed a difference of about 0.05 (95% agreement) for two technicians to analyze different samples of disectors in a single brain. In contrast, intra- and inter-variability for the ASF by the same and different operators is negligible. Except for a few parameters such as minimum and maximum sizes for neuron regions, most of the parameters in the framework are set in an automatic and adaptive manner separately for each image, making the results of the framework consistent with variations in image acquisition. Because images collected in the dataset had varying brightness (FIG. 5), intensity thresholds were set adaptively by the estimated GMM for each image, allowing the ASF to produce consistent segmentations for different cell types, staining intensities and microscope settings. Despite the low statistical power in this study, both the ground truth and ASF showed evidence of cortical neuron loss in brains of Tg4510 mice at 6-8 months of age as previously reported.

In this validation study, cell counts using the automatic framework strongly correlates with counts in exactly the same disector volumes using the manual optical disector. Furthermore, this approach allows for examination of the basis for discrepancies between the ASF and "ground truth." On sections with the lower ground truth counts, e.g., sections 1-7 in FIG. 4 (c), the vast majority of mismatches occur when the data collector fails to resolve overlapping neurons. The ASF according to the present invention handles this situation better by applying the segmentation algorithm to split each cell at its optimal plane of focus in 3-D.

The EDF image shows each cell at its maximal plane of focus in the disector volume. Segmentation of these profiles is required to count those inside the disector frame and not overlapping with exclusion planes. In addition to this purpose, segmented cell profiles are useful for estimating the size distribution using unbiased local size estimators, as has been previously reported. The incorporation of cell size into the results further improves the framework's throughput efficiency vis-á-vis ground truth since estimating cell size requires negligible time and effort compared to cell number alone. By contrast, estimation of cell number and size requires twice the time and effort for the manual stereology workflow compared to cell number alone.

The high correlation of Neu-N counts by manual and automatic approaches (Table 1) shows the framework can be practically used to automate the time- and labor-intensive task of cell counting by unbiased stereology. The total processing time for the automatic approach was between 25 and 30 minutes for counting immunostained cells in a single reference space. This time includes low-power outlining of the reference area and automatic capture of disector stacks on each section (_18 to 20 minutes), and a computation time of about 6 to 8 minutes to create EDF images and run the algorithm. It is expected that analyzing images in RAM will decrease the analysis time per case to about 20 minutes or less.

Example 4

This example combines existing hardware for computerized stereology with software driven by deep learning from a CNN. The CNN automatically segments immunostained neurons, astrocytes and microglial cells on images of 3-D tissue volumes (disector stacks; for EDFs, see FIG. 2(b) for neurons, FIG. 15 for astrocytes and microglia) and make unbiased estimates of total cell numbers using the automatic optical fractionator method.

Figure 14:
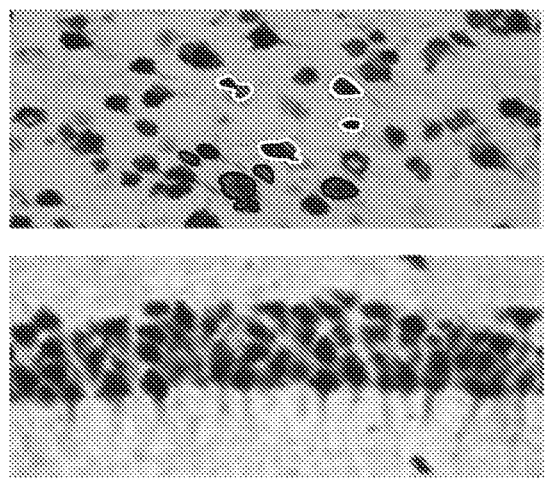
FIG. 14 shows NeuN immunostained neurons in mouse brain section. Example of low (cortex; upper) and high (CA1; lower) packing density.
Figure 15:
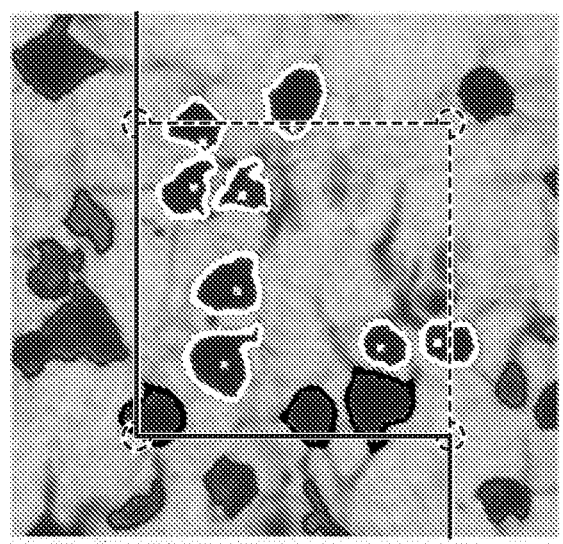
FIG. 15 EDF image showing neurons segmented by ASA method.
Figure 16:
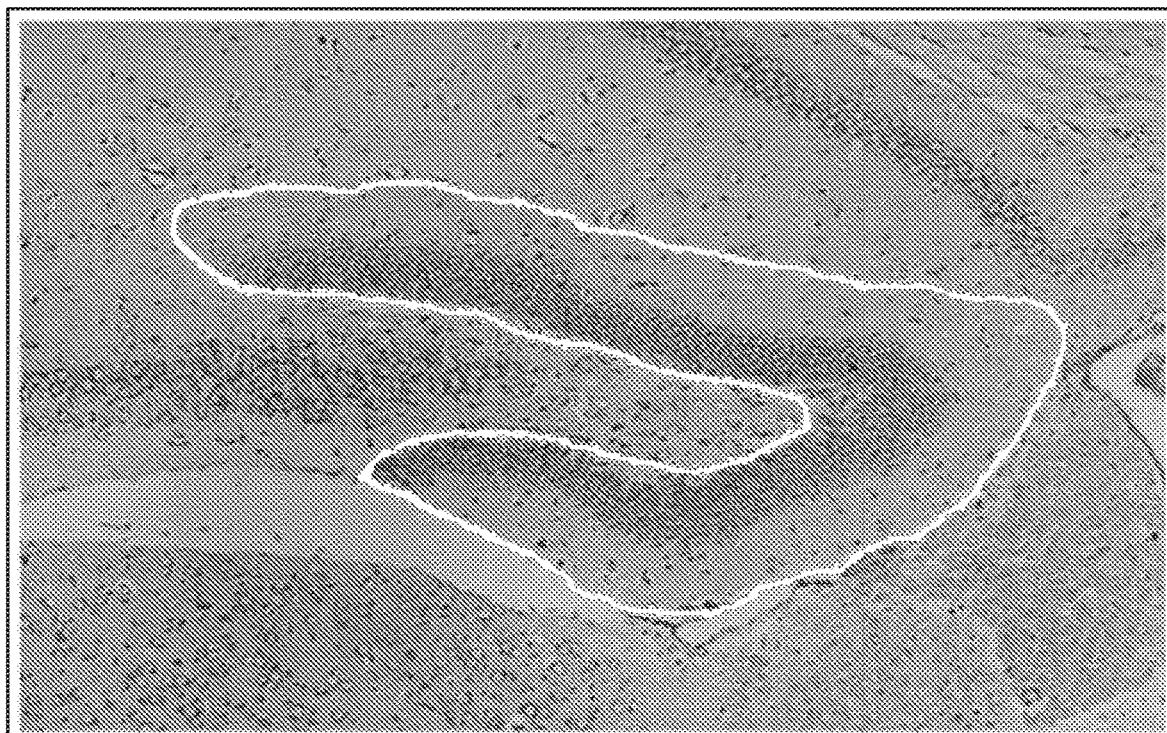
FIG. 16 shows outlined reference space on tissue sections of mouse brain.

The optical fractionator method can provide an unbiased stereology estimate of cell number provided the cells can be effectively segmented. Separate adaptive ASAs can be used to segment each cell type or deep transfer learning can be used to train a CNN to segment cells. The ASA approach can require adjusting parameters and other customization steps (pre- and post-processing) to accurately segment cells with variable morphologies, staining characteristics, and cell densities (FIG. 14). Alternatively, training one or more CNNs can require many person-hours of manual annotation of EDF images to collect ground truth. Since deep learning requires good but not extreme accuracy of input images for ground truth the results from the automatic ASA can be used to automatically train the model. Moreover, a further step is implemented to enhance the training set and address customer concerns about accepting fully automatic data; i.e., automatic stereology results without end user verification.

In one embodiment, a semi-automatic mode of the automated stereology is provided. In certain such embodiments, after EDF images are segmented by the ASA, but before training the model, the counts (clicks) on the segmented cells will be displayed to an end user for confirmation (see, for example, FIG. 17). At this point the end user can accept the automatically generated count or modify the count by adding counts based on false negatives and/or removing counts from false positives. This step can reduce the effort for annotating ground truth and require minimal effort from the end user (see, for example, FIG. 17). Compared to manual stereology counting the work is simple, non-tedious and straightforward. End users can view and edit counts from the ASA. Typically, the time to annotate ground truth for deep learning for each cell type per brain will be far less than the 4-5 hours of difficult cell counting for manual stereology. Also, the efforts involved in annotating ground truth for deep learning for each cell type per brain can be less than training the model by manually annotating ground truth. Once the deep learning model is trained from these annotated images, analysis of EDF image sets from the test cases will take about 10 minutes for the motorized microscope stage to automatically capture disector stacks and a few seconds for segmentation and stereology. The results will be a trained model from expert-validated ground truth for analysis of subsequent test cases in 15 minute or less. As such, this Example of the invention provides a novel technology for automatic stereology of histological sections with deep learning, and optionally, an expert input. For optimal brain related applications, the total numbers of three important cells (neurons, astrocytes, microglia) in brains, for example, mouse brains, can be quantified on counterstained tissue sections from regions with a wide range of packing densities (cortex, CA1; FIG. 14). To this end, deep learning with a CNN model trained by expert-validated ground truth can be generated by the ASA method. This approach provides sufficient cell segmentation to overcome the technical barriers and achieves performance metrics.

The accuracy, precision, and efficiency of quantifying neural elements, e.g., cells in stained tissue sections depend on how the analysis is done. A 2-D sampling probe (for example a knife blade) arbitrarily samples cells with an unknown and unknowable probability related to the cell's size, shape, and orientation. Unbiased stereology can provide the theoretical basis for avoiding this and other sampling and estimation biases. However, the current technology with manual stereology is prohibitively time-consuming and laborious for a large and growing number of studies. In search of faster methods for quantifying histological sections, many neuroscientists have turned to less accurate methods. The availability of automated and semi-automated microscope slide scanners has stimulated interest in semi-quantitative image analysis of 2-D images at lower magnification (40× or lower). Due to the Corpuscle Problem (see, for example, FIG. 12), the total number of 3-D cells in tissue is not equal to the total number of their 2-D profiles on tissue sections (i.e., Total N3-D cells≠Total N2-D prof). Moreover, a survey of automatic algorithms proposed to improve efficiency of cell counting methods showed these approaches do not report cell counts but rather density (number per unit area or volume) of 2-D cell profiles. The focus on density estimates leads to data biased by artifacts from tissue processing. Another problem is systematic underestimation of counts at low power due to over-projection and masking (see, for example, FIG. 3). As illustrated in FIG. 3, the low-resolution/high depth of field lens causes multiple objects to be counted as one. Hence, a high-resolution lens with low depth of fields is required for accurate counts using the optical fractionator. High magnification is needed for accurate counts due to the need to determine the section thickness, i.e., difference in distance between the upper and lower optical planes of each section, which can be done either manually or automatically. To avoid the numerous sources of stereological bias from these semi-quantitative approaches, the embodiments of the subject invention provide alternatives to current quantitative approaches for manual stereology with automated stereology.

The automated stereology of the invention can be validated and optimized using the ASA/CNN approach for the populations of high S:N stained brain cells of greatest clinical interest, such as neurons, astrocytes and microglia. These goals can be achieved by, among other things:

1. Developing standardized, high-throughput, deep learning networks for quantifying stereology parameters of neural tissues with high S:N by immunostaining. The automated stereology method of the invention with an ASA was used to quantify total number of NeuN-immunostained neurons on EDF images from mouse cerebral cortex (see, for example, Tables 3-4). These data confirm automatic stereology for total neuron number is equivalent to manual counts but with 10 times greater throughput. Comparison of both datasets with true counts from 3-D reconstruction of disector stacks (data not shown) revealed 20-30% more accuracy versus current state-of-the-art manual stereology.

However, the same ASA did not segment neurons as well in brain regions with high packing densities (CA1). With customization for each cell type in regions with low and high packing densities using the ASA method might eventually achieve similar performance as for NeuN neurons in an area with low packing density (see, for example, FIG. 13). Rather than attempting to overcome these technical barriers using the ASA approach, deep learning can be used to segment each cell type in brain regions with low and high packing densities.

TABLE 3

NeuN neuron counts by manual vs. automatic stereology in the same disectors of four mice.

| Collector (C) | Mouse ID | Manual | Auto. Count | $R^2$ |
|---|---|---|---|---|
| 1, 2* | 02 | 1249 | 1238 | >0.96 |
| 2 | 21 | 858 | 878 | >0.98 |
| 1 | 03 | 570 | 603 | >0.98 |
| 1 | 09 | 558 | 697 | >0.98 |

$R^2$ = correlation for manual and automatic counts.
*average counts between two collectors (C1 and C2) for the same brain

TABLE 4

Comparison of manual and automatic stereology for total number (±SEM) of NeuN neurons in neocortex of Tg4510 mice and non-Tg controls.

| Group | N | Manual Stereology | | Automatic Stereology | | % diff$_{NeuN}$ |
| | | Mean Neu-N | SEM$_{NeuN}$ | Mean Neu-N | SEM$_{NeuN}$ | |
|---|---|---|---|---|---|---|
| Non-Tg (n = 2) | 2 | 1.30E+06 | 1.18E+5 | 1.39E+06 | 7.71E+04 | +7 |
| Tg4510 (n = 2) | 2 | 9.81E+05 | 2.76E+3 | 1.02E+06 | 1.41E+04 | +4 |
| % diff$_{NeuN}$ | | −25 | | −27 | | |

2) Developing automatic stereology software consistent with current standards of commercial programs for neuroscience research. Currently, 100% of the approximately 3500 stereology studies done worldwide use computer assisted systems that rely on manual cell counting. Many end users are reluctant to completely rely on automatic stereology to collect results that are critical to their research programs. Therefore, a confirmation step is provided in certain semi-automated stereology embodiments of the invention that allow end users to confirm or edit ground truth prior to training the model.

Other potential outcomes of the automated stereology of the invention are shown in Table 5.

TABLE 5

Expected benefits of the automated stereology method of the claimed invention.

| | |
|---|---|
| I. | Increased efficiency of hypothesis testing of basic and preclinical research |
| II. | Cost savings for labor, time, and equipment to complete studies |
| III. | Greater time spent on productive research activities |
| IV. | Faster progress toward understanding the pathology, natural history, genetics, and therapeutic management of neurological diseases and mental illnesses |
| V. | Improved health, longevity, and quality of life. |

The performance metrics for optimal performance of the automated stereology of the invention are shown in Table 5. The performance metric for accuracy can be assessed in comparisons to results from 3-D reconstruction, i.e., cell counts by well-trained experts of each cell type by careful counting through disector stacks. These "gold standard" counts that give the true number of cells in each disector volume can be done blind to results from automatic stereology.

TABLE 6

Performance Metrics

ACCURACY

| | |
|---|---|
| Algorithm performance vs. 3D Gold Standard Dice Similarity Coefficient (DSC | Specificity (false positive): <5% Sensitivity (false negative): <5% Acceptable: DSC 0.7: Poor: DSC <=0.7 (considered misses) |

PRECISION

| | |
|---|---|
| Inter-rater Reliability | Test/Retest same or different user: |

EFFICIENCY

| | |
|---|---|
| Compared to Manual Stereology | Semi-automatic Mode: >10x faster Fully-automatic Mode: >20x faster |

[1]Manual counts via 3D counts of cells in disector stacks (z-axis images through a known volume)
[2]For NeuN neurons, GFAP astrocycles, Iba1 microglia in neocortex and CA1 (hippocampus)

Stained tissue sections from male and female mice can be obtained. For example, stained tissue sections from normal (wild type) mice and a genetically modified mouse model (rTg4510 line) of neurodegeneration and neuroinflammation can be analyzed for the purposes of development and validation of the deep learning model. One set of every nth section will be sampled in a systematic random manner to obtain 8-12 tissue sections from regions with low (neocortex) and high (CA1) packing densities. Hardware in a stereology system can include of a Leica DM2500 microscope with low (4×), mid (40×) and high power (100×) objectives, motorized X-Y-Z stage (Prior Electronics, Rockland, Mass.), Sony Firewire DXC-C33 camera, and a PC computer. The following section gives the step-by-step procedure for collecting EDF images for training the CNN to segment immunostained brain cells in cortex and CA1 regions.

1) At low mag (4-5×) viewing of systematically sampled sections through the reference space, the end user outlines reference area (outlined in green) on the tissue section (see, for example, FIG. 16):

2) At high power (63×, oil), the automated stereology of the invention determines the section thickness for calculation of reference space volume.

Figure 17:
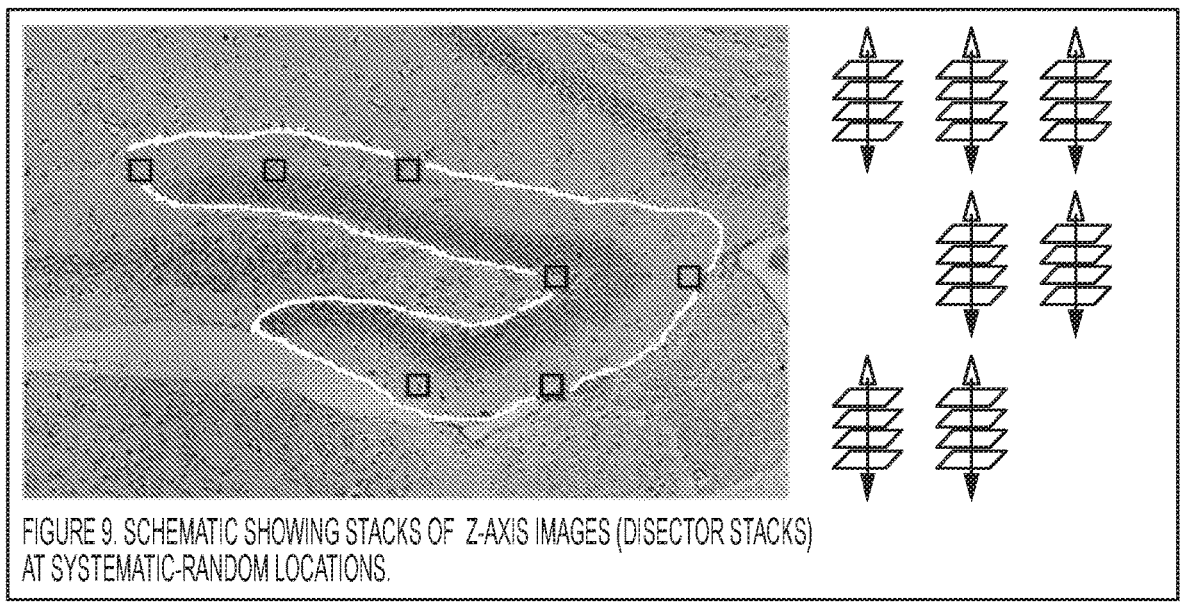
FIG. 17 shows schematic showing stacks of z-axis images (disector stacks) at systematic-random locations.

3) The automated stereology can follow a two-step process to generate EDF images from disector stacks: a) drive the motorized stage to automatically capture stacks of z-axis images (disector stacks) at about 200 systematic-random locations across x-y area of reference space for all 8-12 sections through reference volume (FIG. 17 shows 7 locations for 1 section). The x-y distance from one Z stack to the next is consistently spaced (such as 200 µm apart) and the images from the previous Z stack need not touch as there is no "stitching" involved.

Each image "slice" in the Z stack can be 1 µm thick. Tissue originally cut at 40 µm can yield 20-25 images per stack due to processing/shrinkage; and b) create EDF images from each disector stack. EDF image can capture all cells in the disector volume at their optical resolution and displays them on a 2-D image.

Figures 18, 19:
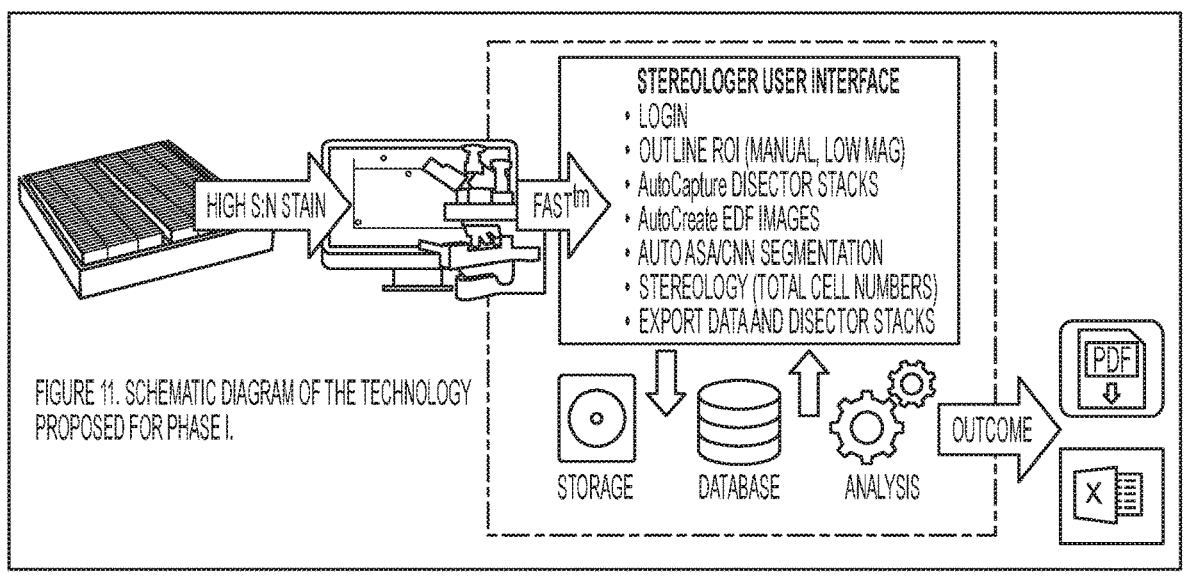
FIG. 18 shows results for predicted segmentation of EDF images using the CNN.
FIG. 19 shows schematic diagram of the automated stereology of the invention. (FAST™ stands for "Fully Automatic Stereology Technology," a phrase used to describe certain embodiments of the automated stereology of the invention.)

In certain embodiments, the automated stereology of the invention can use a deep learning architecture (Unet) neural network with 19 convolution layers, 4 max pooling layers, and 4 up-sampling convolution layers. The input-to-input layer can use gray level images of size 160*160 pixels, 27 hidden layers, and an output layer that gives binary image of the segmentation of size 160*160 pixels. As part of the preliminary data, image datasets were trained, validated, and tested using the Unet deep learning architecture. Images were cropped based on the exclusion/inclusion lines of the disector frame (see, for example, FIG. 15) and resized to be a uniform size of 160*160 pixels. Labels of the EDF images (mask images) were created to show neurons as white and the background as black (binary images). Images were augmented with rotations of 15 degrees giving 14400 and 4800 training and validation images, respectively. A second dataset of 139 images without augmentation were used as test cases. The deep learning open source platform Keras (frontend) and Tensorflow neural network library (backend) were utilized. FIG. 18 shows the predicted segmentation for the prototype software. Masks (ground truth) were created from EDF images to represent the annotation images by experts or by the ASA method. Unet was used to train and validate data subsets.

The Dice coefficient for the model was 0.905. The Dice coefficient is a measurement of similarity of two samples. In this case, the similarity of the segmentation generated from the automated stereology of the invention was compared to the segmentation from experts (ground truth).

DICE coefficient equation $$\text{Dice coefficent} = \frac{2 * |A \cap B|}{|A| + |B|}. \quad \text{Equation 1}$$

Optical fractionator formula $$\text{Total } N_{cell} = \left[\sum Q - \right] \cdot F1 \cdot F2 \cdot F3. \quad \text{Equation 2}$$

The Dice coefficient formula is: where $|A \cap B|$ is the total number of true positives: pixels that have intensity of "one" in both A and B, $|A|$ is the total number of positives in the ground truth (nonzero pixels), and |B| is total number of predicted positives: pixels appear as "one" in B.

To avoid potential edge effects for cells only partially visible on the inclusion line in the cropped EDF images, the predicted segmentation will be overlaid on its corresponding original EDF image before cropping. After processing the output with morphological operations to remove small regions, separate loosely connected regions, etc., Fast Radial Basis Symmetry filter (of different sizes) will be used to first detect points inside different cells. Every detected point is then used to morphologically reconstruct the map and all cells not intersecting exclusion lines are counted. The segmentation output of the CNN followed by the post processing steps will give the total number of each cell type in each disector volume (EDF image). For each brain, the total number of each cell type (Total Ncell) will be estimated according to the optical fractionator method, as we have recently shown. Since the sum of all disector volumes is a known fraction of the total volume of each region, the optical fractionator method allows for scaling from EDF images to the total region (cortex, CA1) based on the number of cells counted in the disector volumes for each brain as shown in Equation 2, where [ΣQ-] is the sum of cells counted in all EDF images; F1 is the reciprocal of the section sampling fraction (ssf); F2 is the reciprocal of the area sampling fraction (asf); and F3 is the reciprocal of the thickness sampling fraction (tsf).

Transfer learning is one solution that may help to segment cells identified by different stains and limit the number of EDF images for training the model. With this technique, knowledge learned from previous trained tasks can be applied to new task in a related domain. The ground truth data for training can be created with a combination of human neuron segmentation and automatic segmentation. The neuron segmentation model can be tuned to segment Iba-1 immunostained microglia from ground truth. As ground truth creation is tedious and time consuming, the minimal number of EDF images needed to tune the existing segmentation network are determined to achieve performance metrics (Table 6). The neuron segmentation network can then be tune to segment GFAP-immunostained astrocytes, again with a lower requirement for labeled training data. Due to stain variability, preprocessing can clean the ground truth masks of unnecessary blobs that could affect the segmentation model. In addition, post-processing can be used to help masking blobs below a certain threshold, after which a morphological operation for eroding and dilation could be applied to overcome variations in staining characteristics. Therefore, transfer learning, images preprocessing, and post processing are promising tools to overcome the technical risk. It is also possible to label enough images, for example, twelve to twenty thousands, to train each segmentation system without transfer learning though the labeling process time will make for slower progress. Finally, if the segmentation learned by the deep neural network is unexpectedly inadequate, different adaptive algorithms can be optimized for cell segmentation on EDF images.

Example 5

Dementia from Alzheimer's disease and other neurodegenerative conditions is a significant threat to worldwide health care systems. Embodiments of the subject invention can create, quantify and display synaptic degeneration across whole brain maps. Whole Brain Deep Learning Stereology can create extended depth of field (EDF) images from 3-D stacks of z-axis images (disector stacks) stained for presynaptic boutons through the entire brain. Segmentation and deep learning can be used on these EDF images to make automated stereology counts of synaptophysin-immunopositive boutons independent of regional boundaries across the entire brain. The numbers of synapses within each disector stack are automatically quantified for each brain and validated in the X-Y-Z planes through post-processing steps. For example, embodiments of the subject invention can be configured generate a three dimensional computer simulation of the tissue sample from a stack of z-axis images. The three dimensional computer simulation can be segmented along the x-axis and separately along the y-axis. The 3D dimensional computer segments can be visually inspected to determine a cell count or processed through software. In certain embodiments, analysis software can be configured to apply segmentation and deep learning techniques as described herein to generate automated stereology counts from the x and y planes. The stereology counts from the x, y, and z planes can be compared to validate the cell counts. In other embodiments of the subject invention, optical dissection can be performed from the x, y, and z planes of the tissue sample. As such, a synaptic map for brain can be automatically generated in one hour or less with comparable accuracy to 3-D reconstruction (gold standard), which is currently prohibited for routine studies due to the high time and labor requirement.

In certain embodiments, the invention can provide learning convolutional neural network to automatically count synaptic boutons stained with the presynaptic immuno-marker synaptophysin. Performance testing can test for accuracy, precision, and efficiency of automatic compared to manual stereology methods. The automated stereology of the invention can provide greater than 95% accuracy compared to gold standard, i.e., synapse counts by 3-D reconstruction in the same disector stacks.

A cross-sectional study can be conducted using the optimized automated stereology of the invention on synaptophysin-immunostained tissue sections from behaviorally tested young (2-3 months) and old (6-8 months) Tg4510 mice and age- and sex-matched non-tg controls. Whole brain synaptic mapscan show synaptic degeneration across brain regions associated with cognitive decline.

Whole brain maps can show regionally independent areas of synaptic innervation/degeneration in treatment and control groups. Since diffuse synaptic loss is the strongest structural correlation for dementia in Alzheimer's disease and cognitive impairments in animal models, these whole brain synaptic maps can accelerate translation of preclinical studies into potential neuroprotective therapeutics and drug discovery for Alzheimer's disease in several ways. Whole brain synaptic maps can allow for accurate, reproducible, and high-throughput screening of lead candidates. Since these synaptic maps include the entire brain the full impact of potential treatments can be identified. Automatic creation of stereology-based synaptic maps may also eliminate the subjective influence of end-user training, experience, distractions, fatigue, motivation, etc. that currently confound No/Go decisions based on qualitative histopathology. In support of rapid, broad adoption, the automated stereology of the invention can use motorized XYZ stage, bright-field microscope and digital camera hardware.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification. Particularly, this specification incorporates by reference U.S. Pat. No. 9,297,995, to the extent it is consistent with the teachings disclosed herein.

REFERENCES

[1] Benali A, Leefken I, Eysel U F, Weiler E. A computerized image analysis system for quantitative analysis of cells in histological brain sections. J Neurosci Meth. 2003; 125: 33-43.

[2] Bradley, A. P., Bamford, P. C. A one-pass extended depth of field algorithm based on the over-complete discrete wavelet transform, in: Image and Vision Computing'04 New Zealand (IVCNZ'04), 2004, pp. 279-284.

[3] Chaudhury, B. H. Ahmady Phoulady, D. Goldgof, L. O. Hall, P. R. Mouton, A. Hakam, and E. M. Siegel. An Ensemble Algorithm Framework For Automated Stereology Of Cervical Cancer. In A. Petrosino, editor, Image Analysis and Processing ICIAP, volume 8156, pages 823-832. Springer Berlin Heidelberg, 2013.

[4] Costa L, Bollt E. A fast and accurate nonlinear spectral method for image recognition and registration. Appl Phys Lett. 2006; 89:174102.

[5] Gundersen, H. J. G., Bendtsen, T. F., Korbo, L., Marcussen, N., Møller, A., Nielsen, K., Nyengaard, J. R., Pakkenberg, B., Serensen, F. B., Vesterby, A., and West, M. J. Some New, Simple, and Efficient Stereological Methods and Their Use in Pathological Research and Diagnosis. APMIS 96: 379-394, 1988a.

[6] Gundersen, H. J. G., Bagger, P., Bendtsen, T. F., Evans, S. M., Korbo, L., Marcussen, N., Moller, A., Nielsen, K., Nyengaard, J. R., Pakkenberg, B., Sorensen, F. B., Vesterby, A. and West, M. J. The new stereological tools: Disector, fractionator, nucleator and point sampled intercepts and their use in pathological research and diagnosis. APMIS 96:857-S81 (1988b).

[7] Ho S Y, Chao C Y, Huang H L, Chiu T W, Charoenkwan P, Hwang E. NeurphologyJ: an automatic neuronal morphology quantification method and its application in pharmacological discovery. BMC Bioinformatics. 2011.

[8] Inglis, A., Cruz, D., Roe, H E, Stanley, D L, Rosene, D., Urbanc, B. Automated identification of neurons and their locations. J Microsc. 230: 339-352, 2008.

[9] Lin G, Chawla M K, Olson K, Guzowski J, Barnes C, Roysam B. Hierarchical, model-based merging of multiple fragments for improved three-dimensional segmentation of nuclei. Cytometry. 2005; 63A:20-33.

[10] Liu J Y, Ellis M, Brooke-Ball H, de Tisi J, Eriksson S H, Brandner S, Sisodiya S M, Thornm M. High-throughput, automated quantification of white matter neurons in mild malformation of cortical development in epilepsy. Acta Neuropathol Commun., 13; 2:72, 2014.

[11] Long X, Cleveland W L, Yao Y L. A new preprocessing approach for cell recognition. IEEE T Inf Technol B. 2005; 9:407-412.

[12] Long X, Cleveland W L, Yao Y L. Automatic detection of unstained viable cells in bright field images using a support vector machine with an improved training procedure. Comput Biol Med. 2006; 36:339-362.

[13] Mouton, P. R., Gordon, M. Stereological And Image Analysis Techniques For Quantitative Assessment Of Neurotoxicology. In Neurotoxicology, 3rd Edition, Target Organ Toxicology Series, G. Jean Harry, Hugh A. Tilson, (Eds), Taylor & Francis Press, London And New York, Pp. 243-267, March 2010.

[14] Mouton, P. R. Applications Of Unbiased Stereology To Neurodevelopmental Toxicology, In Developmental Neurotoxicology Research: Principles, Models, Techniques, Strategies And Mechanisms (C. Wang And W. Slikke, Eds), John Wiley & Sons, Hoboken, Pg. 53-77, 2011a.

[15] Mouton, P. R. Unbiased Stereology: A Concise Guide. The Johns Hopkins University Press, Baltimore, August, 2011b.

[16] Mouton, P. R. Quantitative Anatomy Using Unbiased Stereology, In CRC Handbook Of Imaging In Biological Mechanics (Corey P. Neu And Guy M. Genin, Editors), CRC Press, London, 579 Pp., Oct. 23, 2014.

[17] Mouton, P. R., Phoulady, H. A., Goldgof, D., Hall, L. O., Siegel, E. Automatic Stereology Of Substantia Nigra Using A Novel Segmentation Framework Based On The Balloon Active Contour Model. Soc. Neurosciences, Chicago, Ill., Oct. 17, 2015.

[18] Mouton, P. R., Phoulady, A., Hall, L. O. Goldgof, D. Tg4510 mice provide an effective model for automatic testing of neuroprotective therapies in early-stage Alzheimer's disease. 2016 Soc. Neurosci, in press.

[19] Nattkemper T W, Ritter H J, Schubert W. A neural classifier enabling high-throughput topological analysis of lymphocytes in tissue sections. IEEE T Inf Technol B. 2001; 5:138-149.

[20] Peng, S., Urbanc, B., Cruz, L., Hyman, B. T., Stanley, H. E. Neuron recognition by parallel Potts segmentation. Proc Natl Acad Sci USA, 100(7):3847-52, 2003.

[21] Phoulady, H. A., Chaudhury, B., Goldgof, D. B., Hall, L. O., Mouton, P. R., Hakam, A., Siegel, E. Experiments in Large Ensemble for Segmentation and Classification of Cervical Cancer Biopsy Images. Proceedings of IEEE International Conference on Systems, Man, and Cybernetics, October 2014.

[22] Phoulady, H. A., Goldgof, D., Hall, L., Mouton, P. R. An Approach For Overlapping Cell Segmentation In Multi-Layer Cervical Cell Volumes," First Place In Overlapping Cervical Cytology Image Segmentation Challenge, IEEE ISBI, Brooklyn, N.Y., March 2015.

[23] Phoulady, H. A., Goldgof, D. B., Hall, L. O., And Mouton, P. R. Histopathology Image Segmentation With Hierarchical Multilevel Thresholding, Proceedings Of The SPIE Medical Imaging On Digital Pathology, San Diego, Calif., February 2016a.

[24] Phoulady, H. A., Goldgof, D. B., Hall, L. O., And Mouton, P. R. A New Approach To Detect And Segment Overlapping Cells In Multi-Layer Cervical Cell Volume Images, Proceedings Of The International Symposium On Biomedical Imaging (ISBI), Prague, Czech Republic, April 2016b.

[25] Ray N, Acton S T, Ley K. Tracking leukocytes in vivo with shape and size constrained active contours. IEEE T Med Imaging. 2002; 21:1222-1234.

[26] Santacruz K, Lewis J, Spires T, Et Al. Tau Suppression In A Neurodegenerative Mouse Model Improves Memory Function. Science. 2005 Jul. 15; 309(5733):476-81.

[27] Sterio, D. C. 1984. The unbiased estimation of number and sizes of arbitrary particles using the disector. J Microscopy. 134:127-136.

[28] Spires, T L, Orne J D, Santacruz K, Et Al. Region-Specific Dissociation Of Neuronal Loss And Neurofibrillary Pathology In A Mouse Model Of Tauopathy. Am J Pathol. 168:1598-607, 2006.

[29] Sjöström P J, Frydel B R, Wahlberg L U. Artificial neural network-aided image analysis system for cell counting. Cytometry. 1999; 36:18-26.

[30] Slater D, Healey G, Sheu P, Cotman C W, Su J, Wasserman A, Shankle R. IEEE Workshop on Applications of Computer Vision (WACV) IEEE Computer Society; Washington, D.C., USA: 1996.

[31] Savitzky, A., Golay, M. J. Smoothing and differentiation of data by simplified least squares procedures. Analytical Chemistry 36 (8) (1964) 1627-1639.

[32] Valdecasas, A. F., Marshall, D., Becerra, J. M., Terrero, J. J. On extended depth of focus algorithms for bright field microscopy. Micron, 32:559-569, 2001.

[33] West M J, Slomianka L, Gundersen H J. Unbiased Stereological Estimation Of The Total Number Of Neurons In The Subdivisions Of The Rat Hippocampus Using The Optical Fractionator. Anat Rec. 231(4): 482-97, 1991.

[34] Wicksell, S. D. The corpuscle problem. A mathematical study of a biometric problem. Biometrika 17: 84-89, 192.

What is claimed is:

1. A method of performing computerized stereology, the method comprising:
   capturing, by an imager, a Z-stack of images of a three-dimensional (3D) object, the Z-stack of images being a sequence of images of the 3D object captured in increments having a step size along a Z-axis of the 3D object; and
   determining, by a processor in operable communication with a non-transitory computer-readable medium, a stereology parameter of the Z-stack of images using a deep learning structured model,
   wherein the non-transitory computer-readable medium has instructions stored thereon that, when executed, cause the processor to use the deep learning structured model to determine the stereology parameter of the Z-stack of images.

2. The method according to claim 1, wherein the deep learning structured model comprises a convolutional neural network (CNN).

3. The method according to claim 2, wherein the deep learning structured model further comprises an adaptive segmentation algorithm (ASA) to segment stained cells from images created from the Z-stack of images.

4. The method according to claim 3, wherein the images created from the Z-stack of images, from which the ASA segments stained cells, are extended depth of field (EDF) images.

5. The method according to claim 2, wherein the CNN comprises a convolutional layer, a Rectified Linear Unit (ReLU) layer, a pooling layer, and a fully connected (FC) layer.

6. The method according to claim 5, wherein the convolutional layer comprises a plurality of filters configured to detect features of the Z-stack of images.

7. The method according to claim 6, wherein each filter of the plurality of filters has the same biases and weights, and analyzes the same number of input neurons, as every other filter of the plurality of filters.

8. The method according to claim 7, wherein each filter convolves across dimensions of an image of the Z-stack of images and computes a dot product of the respective filter and an image subset from among the Z-stack of images to generate a matrix or a feature map, and
   wherein each filter preserves a spatial relationship between pixels of the image of the Z-stack of images as it convolves across dimensions of the image.

9. The method according to claim 8, wherein the ReLU layer applies an activation function to the matrix or the feature map to introduce a non-linear element to the matrix or the feature map, and
   wherein the pooling layer reduces dimensions of the matrix or the feature map, generating an output matrix or an output image for the FC layer.

10. A system for performing computerized stereology, the system comprising:
    an imager configured to capture a Z-stack of images of a three-dimensional (3D) object, the Z-stack of images being a sequence of images of the 3D object, and the imager being configured to capture the sequence of images of the 3D object in increments having a step size along a Z-axis of the 3D object;
    a processor in operable communication with the imager; and
    a non-transitory computer-readable medium in operable communication with the processor and having instructions stored thereon that, when executed, cause the processor to determine a stereology parameter of the Z-stack of images using a deep learning structured model,
    wherein the deep learning structured model comprises a convolutional neural network (CNN).

11. The system according to claim 10, wherein the deep learning structured model further comprises an adaptive segmentation algorithm (ASA) to segment stained cells from images created from the Z-stack of images.

12. The system according to claim 11, wherein the images created from the Z-stack of images, from which the ASA segments stained cells, are extended depth of field (EDF) images.

13. The system according to claim 10, wherein the CNN comprises a convolutional layer, a Rectified Linear Unit (ReLU) layer, a pooling layer, and a fully connected (FC) layer.

14. The system according to claim 13, wherein the convolutional layer comprises a plurality of filters configured to detect features of the Z-stack of images.

15. The system according to claim 14, wherein each filter of the plurality of filters has the same biases and weights, and analyzes the same number of input neurons, as every other filter of the plurality of filters.

16. The system according to claim 15, wherein each filter is configured to convolve across dimensions of an image of the Z-stack of images and compute a dot product of the respective filter and an image subset from among the Z-stack of images to generate a matrix or a feature map, and
    wherein each filter is configured to preserve a spatial relationship between pixels of the image of the Z-stack of images as it convolves across dimensions of the image.

17. The system according to claim 16, wherein the ReLU layer is configured to apply an activation function to the matrix or the feature map to introduce a non-linear element to the matrix or the feature map, and
    wherein the pooling layer is configured to reduce dimensions of the matrix or the feature map, generating an output matrix or an output image for the FC layer.

18. A method for computerized stereology, the method comprising:
    capturing, by an imager, a Z-stack of images of a three-dimensional (3D) object, the Z-stack of images being a sequence of images of the 3D object captured in increments having a first step size along a Z-axis of the 3D object;

determining, by a processor in operable communication with a non-transitory computer-readable medium, a stereology parameter of the Z-stack of images using a deep learning structured model, wherein the non-transitory computer-readable medium has instructions stored thereon that, when executed, cause the processor to use the deep learning structured model to determine the stereology parameter of the Z-stack of images, and wherein the deep learning structured model comprises the following steps:
  constructing images from the Z-stack of images;
  performing clump segmentation on the constructed images by binarizing the constructed images using a threshold determined by estimating a Gaussian Mixture Model to pixel intensities;
  preprocessing the constructed images by converting the constructed images into grayscale and opening by reconstruction followed by closing by reconstruction;
  performing watershed segmentation on the constructed images, wherein regional minima are extracted as foreground markers and boundaries between regions are used as background markers, and the watershed segmentation is applied using the background and foreground makers that overlap with clumps;
  constructing Voronoi diagrams and smoothing, including constructing a Voronoi map using centers of foreground regions and refining region boundaries using a Savitzy-Golay filter; and
  determining the stereology parameter of the Z-stack of images.

19. The method according to claim 18, wherein the constructed images are extended depth of field (EDF) images.

20. The method according to claim 19, wherein the deep learning structured model comprises a convolutional neural network (CNN), and
  wherein the CNN comprises a convolutional layer, a Rectified Linear Unit (ReLU) layer, a pooling layer, and a fully connected (FC) layer.

21. The method according to claim 19, wherein the deep learning structured model further comprises the following steps:
  generating a 3D computer simulation of the 3D object;
  generating an X-stack of sections being a sequence of sections of the 3D computer simulation captured in increments having a second step size along an X-axis of the 3D computer simulation;
  determining a first number of cells contained in the 3D computer simulation from an X-direction;
  generating a Y-stack of sections being a sequence of sections of the 3D computer simulation captured in increments having a third step size along a Y-axis of the 3D computer simulation; and
  determining a second number of cells contained in the 3D computer simulation from a Y-direction.

* * * * *